US012543111B2

(12) United States Patent
Dhanapal et al.

(10) Patent No.: US 12,543,111 B2
(45) Date of Patent: Feb. 3, 2026

(54) DYNAMIC RADIO ACCESS TECHNOLOGY SELECTION FOR 5G WIRELESS DEVICES

(71) Applicant: Apple Inc., Cupertino, CA (US)

(72) Inventors: Muthukumaran Dhanapal, San Diego, CA (US); Ajoy K. Singh, Milpitas, CA (US); Divyaprakash P. Bhojkumar, San Jose, CA (US); Lakshmi N. Kavuri, San Jose, CA (US); Ozgur Ekici, Ottawa (CA); Raghuveer Mallikarjunan, Sunnyvale, CA (US); Rajesh Ambati, Los Altos Hills, CA (US); Rohit Mittal, San Diego, CA (US); Thanigaivelu Elangovan, Santa Clara, CA (US); Ying Huang, San Diego, CA (US)

(73) Assignee: Apple Inc., Cupertino, CA (US)

(*) Notice: Subject to any disclaimer, the term of this patent is extended or adjusted under 35 U.S.C. 154(b) by 368 days.

(21) Appl. No.: 18/194,633

(22) Filed: Apr. 1, 2023

(65) Prior Publication Data

US 2024/0334319 A1 Oct. 3, 2024

(51) Int. Cl.
*H04W 48/18* (2009.01)
*H04W 48/16* (2009.01)
*H04W 72/542* (2023.01)

(52) U.S. Cl.
CPC ........... *H04W 48/18* (2013.01); *H04W 48/16* (2013.01); *H04W 72/542* (2023.01)

(58) Field of Classification Search
CPC ... H04W 48/16; H04W 72/542; H04W 88/06; H04W 36/144; H04W 36/304
See application file for complete search history.

(56) References Cited

U.S. PATENT DOCUMENTS 11,546,860 B2 1/2023 Kumar et al.
11,832,136 B2 * 11/2023 Marupaduga ......... H04L 5/0048
(Continued)

FOREIGN PATENT DOCUMENTS

CN 112806065 B 1/2023
EP 3657856 A1 5/2020
(Continued)

OTHER PUBLICATIONS

Salau Nurudeen Oladehinbo et al., "Machine Learning Analysis of Multi-Radio Access Technology Selection in 5G NSA Network", 2023 IEEE Wireless Communications and Networking Conference (WCNC), IEEE, Mar. 26, 2023, pp. 1-6.
(Continued)

*Primary Examiner* — Julio R Perez
(74) *Attorney, Agent, or Firm* — DICKINSON WRIGHT RLLP

(57) ABSTRACT

Embodiments described herein relate to dynamic selection of radio access technologies (RATs) available for use by 5G wireless devices. Managing selection of RATs to use by a 5G (and 4G LTE) capable wireless device can improve performance, e.g., when an application requires a higher throughput and a 5G SA connection underperforms a 5G NSA connection or a 4G LTE connection. Wireless devices can provide geolocation tagged cellular wireless network information, e.g., network performance measurements and observed properties, to network-based servers that collate and organize the crowd-sourced cellular wireless network information into a location database. The wireless device can use the cellular wireless network information of the location database for a geolocation at which the wireless device is operating to estimate performance for alternate wireless connections and compare to measured performance (Continued)

of a currently used wireless connection to determine whether to switch wireless RAT connections.

19 Claims, 19 Drawing Sheets

(56) References Cited

U.S. PATENT DOCUMENTS

| | | | |
|---|---|---|---|
| 11,937,328 B2* | 3/2024 | Zhang | H04W 24/10 |
| 11,990,981 B2* | 5/2024 | Fan | H04W 48/16 |
| 2019/0007992 A1* | 1/2019 | Kim | H04W 76/27 |
| 2020/0105548 A1* | 4/2020 | Huang | H01L 21/6838 |
| 2020/0163006 A1 | 5/2020 | Lindoff et al. | |
| 2021/0237435 A1* | 8/2021 | Gardner | B41J 2/04508 |
| 2022/0353774 A1 | 11/2022 | Agarwal et al. | |
| 2022/0400418 A1* | 12/2022 | Kim | H04W 48/20 |
| 2023/0308993 A1* | 9/2023 | Jia | H04W 72/542 |
| 2025/0176018 A1* | 5/2025 | Abreu | H04W 72/563 |

FOREIGN PATENT DOCUMENTS

| | | | |
|---|---|---|---|
| WO | WO-2021237435 A1 * | 12/2021 | |
| WO | 2023102805 A1 | 6/2023 | |

OTHER PUBLICATIONS

PCT Patent Application No. PCT/US2024/021220—International Search Report and Written Opinion dated Jul. 10, 2024.

* cited by examiner

5G NR Cell vs 4G LTE Cell Coverage (Overlay Network)

5G NR Cell vs 4G LTE Cell Coverage (Expand Network)

600

| Dynamic RAT Selection Criteria | Comment |
|---|---|
| Smart Data Mode | User Configurable Setting (Default = 'ON') |
| Bandwidth Part Adaptation | Network Setting For Adjustable RF Bandwith |
| Starting Radio Access Technology (RAT) | Criteria to Switch RAT Depends On Current RAT |
| Available RATs | Ending RAT Depends On Available RATs |
| Specific RAT Mode | User Configurable Setting For Enabling Specific RAT(s) |
| High Throughput Usage | Detect High Throughput For Application Usage |
| High Bandwidth Usage | Detect Radio Frequency Bandwidth Configuration |
| Personal Hotspot Usage | Detect Device Configuration |
| Cellular Network Dual Connectivity | Detect Network/Device Connection Configuration |
| Packet Voice Connectivity | Active Voice Over IP or Voice Over IMS Connections |
| Starting and Available RAT Performance | Downlink and/or Uplink Measured and/or Estimated Performance |
| Hysteresis Timers | Delay RAT Switching to Avoid Ping-Pong Effects |

*FIG. 6A*

Dynamic RAT Selection Entry Criteria

610 →

| Initial RAT = 5G SA |
|---|
| High Throughput or High Bandwidth Usage |
| Personal Hotspot Enabled |
| 5G SA Network Congestion Detected |
| 5G SA Dual Connectivity Not Configured |
| No Voice over IP or Voice over IMS Active Session Ongoing |
| Downlink or Uplink Threshold Check Satisfied (Separate DL/UL Control) |

620 →

| Initial RAT = 5G NSA (or 4G LTE) |
|---|
| 5G NSA (or 4G LTE) Network Congestion Detected |
| No 5G SA Network Congestion Detected |

*FIG. 6B*

Dynamic RAT Selection Exit Criteria

630 →

| Initial RAT = 5G SA |
|---|
| High Throughput or High Bandwidth Usage Ends |
| Personal Hotspot Disabled |
| 4G LTE RRC Connection Released |
| Wait For Hysteresis Timer Expiration If 5G SA Disabled For UL Session |

640 →

| Initial RAT = 5G NSA (or 4G LTE) |
|---|
| Hysteresis Timer Expires |
| 5G SA RRC in Idle State |

*FIG. 6C*

DYNAMIC RADIO ACCESS TECHNOLOGY SELECTION FOR 5G WIRELESS DEVICES

FIELD

The described embodiments relate to wireless communications, including methods and apparatus for dynamic selection of radio access technologies (RATs) available for use by 5G wireless devices.

BACKGROUND

Newer generation, such as fifth generation (5G), cellular wireless networks that implement one or more $3^{rd}$ Generation Partnership Project (3GPP) 5G standards are being developed and deployed by network operators worldwide. The newer cellular wireless networks provide a range of packet-based services, with 5G technology providing increased data throughput and lower latency connections that promise enhanced mobile broadband services for 5G-capable wireless devices. The higher data throughput and lower latency of 5G is expected to enable a range of new applications and services as well as improve existing ones. Network operator deployment of 5G standalone (SA) wireless networks will require years of infrastructure improvement. Present fourth generation (4G) long term evolution (LTE) wireless networks will continue to be available, and 5G non-standalone (NSA) wireless networks that provide radio connections via both 4G LTE and 5G new radio (NR) technology in parallel allow for a gradual transition to 5G SA wireless networks. A mobile network operator (MNO) can prioritize connections to a 5G SA wireless network over a 5G NSA wireless network or a 4G LTE wireless network; however, in some circumstances connections via a 5G NSA wireless network or a 4G LTE wireless network can provide higher performance than a connection via a 5G SA wireless network. There exists a need for mechanisms to determine when best to select between different radio access technologies (RATs) for use by 5G wireless devices based a variety of factors.

SUMMARY

This application relates to wireless communications, including methods and apparatus for dynamic selection of radio access technologies (RATs) available for use by 5G wireless devices. Generally, 5G cellular wireless radio connections can offer higher data throughput rates and lower latency connections for 5G wireless devices; however, in some cases, the use of higher frequency bands and shorter range for 5G standalone (SA) wireless connections, which only use 5G radio links, can result in poorer performance than 5G non-standalone (NSA) wireless connections, which can include 4G LTE wireless radio links in parallel with 5G wireless radio links, or 4G LTE wireless connections alone. As 4G LTE technology will coexist with 5G NSA and 5G SA deployments for years, managing selection of RATs to use by a 5G (and 4G LTE) capable wireless device can improve performance when warranted, e.g., when an application requires a higher throughput and a 5G SA connection underperforms a 5G NSA connection or a 4G LTE connection. Multiple wireless devices can be configured to provide geolocation tagged cellular wireless network information, e.g., performance measurements and observed properties of cellular wireless networks, to one or more network-based servers that collate and organize the crowd-sourced cellular wireless network information into a location database, portions of which can be downloaded periodically to or obtained on-demand by a wireless device. The downloaded portions of the location database can be organized into macro-tiles covering a wide geographic area subdivided into micro-tiles covering a narrow geographic area. When one or more dynamic RAT selection entry criteria are satisfied, a communication subsystem, e.g., a baseband processor, of the wireless device can use the cellular wireless network information obtained from the location database corresponding to a geolocation at which the wireless device is operating to estimate performance for alternate wireless connections, e.g., a 5G NSA wireless connection or a 4G LTE wireless connection, and compare to measured performance of a currently used wireless connection, e.g., a 5G SA wireless connection, to determine whether to switch wireless connections. Exemplary dynamic RAT selection entry criteria include use of a high throughput application, enablement of a personal hot spot local wireless connection, or detection of congestion on a presently used wireless network by the 5G wireless device. Additional dynamic RAT selection entry criteria can inhibit the wireless device from switching wireless connections, such as during an active packet voice connection or while configured with 5G SA dual connectivity, to avoid interrupting active services. Switching RATs can depend on specific downlink (DL) and/or uplink (UL) thresholds regarding differences in performance between RATs being satisfied. A requirement for high throughput in the DL or UL direction can trigger evaluation for switching RATs by the wireless device. When the requirement for high throughput is no longer required, the wireless device can return to a previously used RAT connection, which can be delayed until after a hysteresis timer elapses and/or until radio resource control (RRC) connections are in particular states. In some embodiments, the wireless device uses deployment information and/or configuration information for a cellular wireless network of a mobile network operator (MNO), e.g., radio frequency (RF) bands, RF bandwidth, and/or network cell target deployment usage, as part of the one or more dynamic RAT selection entry criteria.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIGS. 6A, 6B, and 6C illustrate tables of exemplary criteria to use for determining entry to, exit from, and selection of RATs in a dynamic RAT selection mode for a wireless device, according to some embodiments.

DETAILED DESCRIPTION

Figure 1:
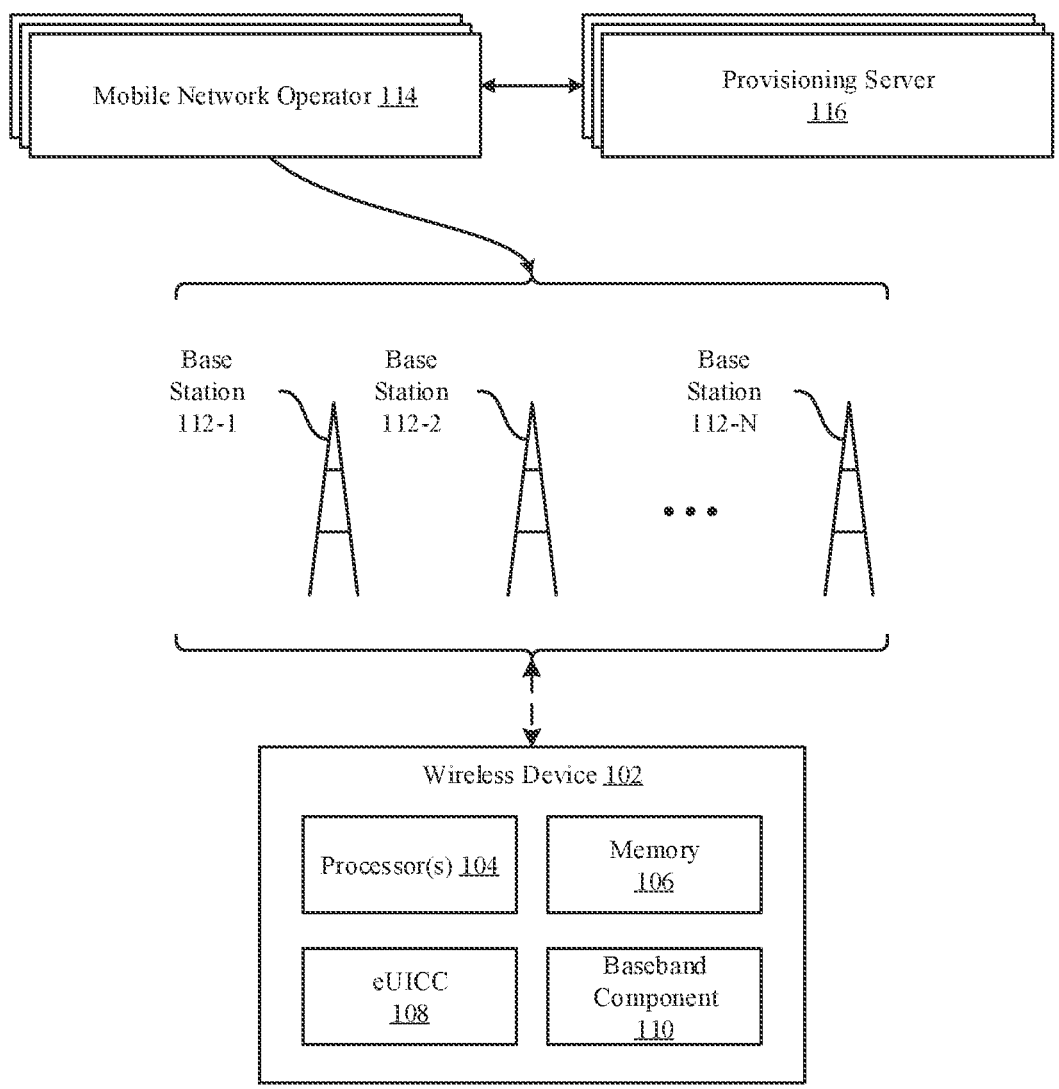
FIG. 1 illustrates a block diagram of different components of an exemplary system configured to implement cellular service provisioning to a wireless device, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

This application relates to wireless communications, including methods and apparatus for dynamic selection of radio access technologies (RATs) available for use by 5G wireless devices. Generally, 5G cellular wireless radio connections can offer higher data throughput rates and lower latency connections for 5G wireless devices; however, in some cases, the use of higher frequency bands and shorter range for 5G standalone (SA) wireless connections, which only use 5G wireless new radio (NR) links, can result in poorer performance than i) the use of 5G non-standalone (NSA) wireless connections, which can include 4G LTE wireless radio links in parallel with 5G wireless NR links, or ii) the use of 4G LTE wireless connections that only use 4G LTE radio links. For example, a wireless device operating at a far-range of a 5G cell but within a mid-range to near-range of a 4G LTE cell may be able to receive higher throughput via a 4G LTE wireless connection than via a 5G SA wireless connection. Moreover, a 5G NSA wireless connection supplements a 5G wireless NR link with a 4G LTE wireless link, which increases available throughput for the 5G NSA wireless connection over the 5G SA wireless connection. In other network deployments, a 5G wireless cell can provide coverage for a cellular wireless network in geographic areas where existing 4G LTE wireless cells are not deployed or have weak throughput, and therefore remaining on a 5G SA wireless connection may be preferred.

As 4G LTE wireless technology will coexist with 5G NSA and 5G SA wireless network deployments for years, managing selection of RATs to use by a 5G (and 4G LTE) capable wireless device can improve performance when warranted, e.g., when an application requires a higher throughput and a 5G SA connection underperforms a 5G NSA connection or a 4G LTE connection. As an alternative to (or in addition to) measurements of available cells where a wireless device is operating, historical cellular network information, obtained by the wireless device and from other wireless devices operating in the same geographic area, can be used to determine whether switching to a connection via a different RAT from a presently used connection will provide improved cellular wireless network performance, e.g., higher throughput, lower latency, etc. Multiple wireless devices can be configured to provide geolocation-tagged cellular wireless network information, e.g., performance measurements and observed properties of cellular wireless networks, such as radio frequency (RF) bands and bandwidths used, to one or more network-based servers that collate and organize the crowd-sourced cellular wireless network information into a location database, portions of which can be downloaded periodically to or obtained on-demand by a 5G wireless device. The downloaded portions of the location database can be organized into macro-tiles covering a wide geographic area, with each macro-tile subdivided into micro-tiles covering a narrow geographic area. For example, a macro-tile can cover an area of 50 km by 50 km, while a micro-tile can cover an area of 500 meters by 500 meters. Macro-tiles of the location database characterizing cellular wireless networks in a geographic region can be downloaded to the wireless device while on a non-cellular wireless connection in the background on a regular schedule or on-demand. Micro-tiles applicable to a geolocation where the wireless device is operating can be provided to a communication subsystem, e.g., including a baseband processor that manages physical layer cellular wireless connections, by an application processor responsive to a query from the baseband processor for one or more micro-tiles. The crowd-sourced cellular network information can be used to assist the baseband processor to determine whether to switch to a different RAT than presently used, such as by disabling a 5G SA capability of the wireless device to force a change to a 5G NSA connection or to a 4G LTE connection.

The wireless device can monitor a set of one or more dynamic RAT selection entry criteria to determine whether to evaluate existing measured performance of a presently used RAT against an estimated performance for the wireless device to use another RAT. When at least one of the one or more dynamic RAT selection entry criteria are satisfied, a communication subsystem, e.g., a baseband processor, of the 5G wireless device can use cellular wireless network information obtained from the location database corresponding to a geolocation at which the 5G wireless device is operating to estimate performance for alternate wireless connections, e.g., a 5G NSA wireless connection or a 4G LTE wireless connection, and compare to measured performance of a currently used wireless connection, e.g., a 5G SA wireless connection, to determine whether to switch wireless connections. Exemplary dynamic RAT selection entry criteria include initiation and/or active use of a high throughput application, enablement of a personal hot spot local wireless connection, or detection of congestion on a presently used wireless network by the wireless device. Additional dynamic RAT selection entry criteria can inhibit the wireless device from switching wireless connections, such as during an active packet voice connection, e.g., a voice over Internet Protocol (VOIP) or voice over Internet Multimedia Service (VoIMS) call, to avoid interrupting an active service connection, or while configured with 5G SA dual connectivity, which allows for carrier aggregation across multiple RF bands to provide another means for improved throughput performance for the wireless device. Switching RATs can depend on specific downlink (DL) and/or uplink (UL) thresholds regarding differences in performance (e.g., throughput, RF bandwidth, etc.) between connections for the RATs being satisfied. A requirement for high throughput in the DL direction or in the UL direction can trigger evaluation for switching RATs by the 5G wireless device. In some embodiments, the wireless device evaluates whether to switch RATs based on cellular wireless network deployment information for cellular wireless networks in the geographic area where the wireless device is operating. For example, the wireless device can determine whether a cellular wireless network uses particular radio frequency bands for different RATs that result in different coverage areas for each RAT. In another example, the wireless device can determine whether a first RAT is used to augment (provide additional coverage) for a cellular wireless network that has weak or no coverage with a second RAT. In some embodiments, the wireless device estimates performance for a cellular wireless network using crowd-sourced throughput performance for the cellular wireless network extracted from the location database. In some embodiments, the wireless device uses deployment information and/or configuration information for a cellular wireless network of a mobile network operator (MNO), e.g., radio frequency (RF) bands, RF bandwidth, and/or network cell target deployment usage, as part of the set of dynamic RAT selection entry criteria. For example, the wireless device can estimate performance for a cellular wireless network using cellular wireless network operating parameters, e.g., RF bands and/or RF bandwidths, when crowd-sourced throughput performance for the cellular wireless network is unavailable or deemed insufficiently reliable (e.g., a limited number of sample data points for the throughput performance of a particular RAT at a particular location have been collected by the location database servers). In some embodiments, a wireless device determines to switch from an existing 5G SA connection to a 5G NSA connection or to a 4G LTE connection and disables a 5G SA capability of the wireless device, locally releases the 5G SA connection, and falls back to a 5G NSA connection or a 4G LTE connection.

The wireless device can monitor a set of dynamic RAT selection exit criteria to determine whether to return to a previously used RAT. For example, when a requirement for high throughput is no longer required, the wireless device can return to a previously used RAT connection. The wireless device can delay returning to the previously used RAT connection until after a hysteresis timer elapses (e.g., to avoid ping-pong switching between RATs) and/or until radio resource control (RRC) connections for the presently used RAT connection and/or the previously used RAT connection are in particular states. When the previously used RAT connection is a 5G SA connection and the presently used RAT connection is a 5G NSA connection or a 4G LTE connection, the wireless device can wait until an RRC connection for the 4G LTE connection (or 4G LTE radio link of the 5G NSA connection) is released before re-enabling a 5G SA RAT capability for the wireless device. In some embodiments, the wireless device can return to the 5G SA cellular wireless network via an LTE to new radio (L2NR) re-direction or re-selection procedure. In some embodiments, when the presently used RAT connection is a 5G NSA connection or a 4G LTE connection, the wireless device can wait until a hysteresis timer expires and an LTE RRC connection is in the idle state before enabling the 5G SA capability of the wireless device, after which the wireless device can return to the 5G SA connection via a cell selection procedure. In some embodiments, when the presently used RAT connection is a 5G SA connection and the previously used RAT connection was a 5G NSA connection or a 4G LTE connection, the wireless device can wait until a hysteresis timer expires and the 5G SA RRC connection is in an idle state before disabling the 5G SA capability of the wireless device, after which the wireless device can move to a 5G NSA connection or a 4G LTE connection via a cell selection procedure.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

These and other embodiments are discussed below with reference to FIGS. 1 through 10; however, those skilled in the art will readily appreciate that the detailed description given herein with respect to these figures is for explanatory purposes only and should not be construed as limiting.

FIG. 1 illustrates a block diagram of different components of a system 100 that includes i) a wireless device 102, which can also be referred to as a mobile wireless device, a wireless communication device, a mobile device, a user equipment (UE), a device, and the like, ii) a group of base stations 112-1 to 112-N, which are managed by different Mobile Network Operators (MNOs) 114, and iii) a set of provisioning servers 116 that are in communication with the MNOs 114. The wireless device 102 can represent a mobile computing device (e.g., an iPhone® or an iPad® by Apple®), the base stations 112-1 to 112-N can represent cellular wireless network entities including fourth generation (4G) Long Term Evolution (LTE) evolved NodeBs (eNodeBs or eNBs) and/or fifth generation (5G) NodeBs (gNodeBs or gNBs) that are configured to communicate with the wireless device 102, and the MNOs 114 can represent different wireless service providers that provide specific services (e.g., voice and data) to which a user of the wireless device 102 can subscribe to access the services via the wireless device 102. Applications resident on the wireless device 102 can advantageously access services using 4G LTE connections and/or 5G connections via the base stations 112. The wireless device 102 can include processing circuitry, which can include one or more processors 104 and a memory 106, an embedded Universal Integrated Circuit Card (cUICC) 108, and a baseband component 110. In some embodiments, the wireless device 102 includes one or more physical UICCs, also referred to as Subscriber Identity Module (SIM) cards (not shown), in addition to the eUICC 108. The components of the wireless device 102 work together to enable the wireless device 102 to provide useful features to a user of the wireless device 102, such as cellular wireless network access, non-cellular wireless network access, localized computing, location-based services, and Internet connectivity. The cUICC 108 can be configured to store multiple electronic SIMs (eSIMs) for accessing services offered by one or more different MNOs 114 via communication through base stations 112-1 to 112-N. To be able to access services provided by the MNOs, one or more eSIMs can be provisioned to the eUICC 108 of the wireless device 102. In some embodiments, a wireless device configuration can determine whether the wireless device can access services via one or more particular radio access technologies (RATs), e.g., via a 5G standalone (SA) connection to a 5G SA cellular wireless network, via a 5G non-standalone (NSA) connection to a 5G NSA cellular wireless network, or via a 4G LTE connection to a 4G LTE cellular wireless network.

Figure 2:
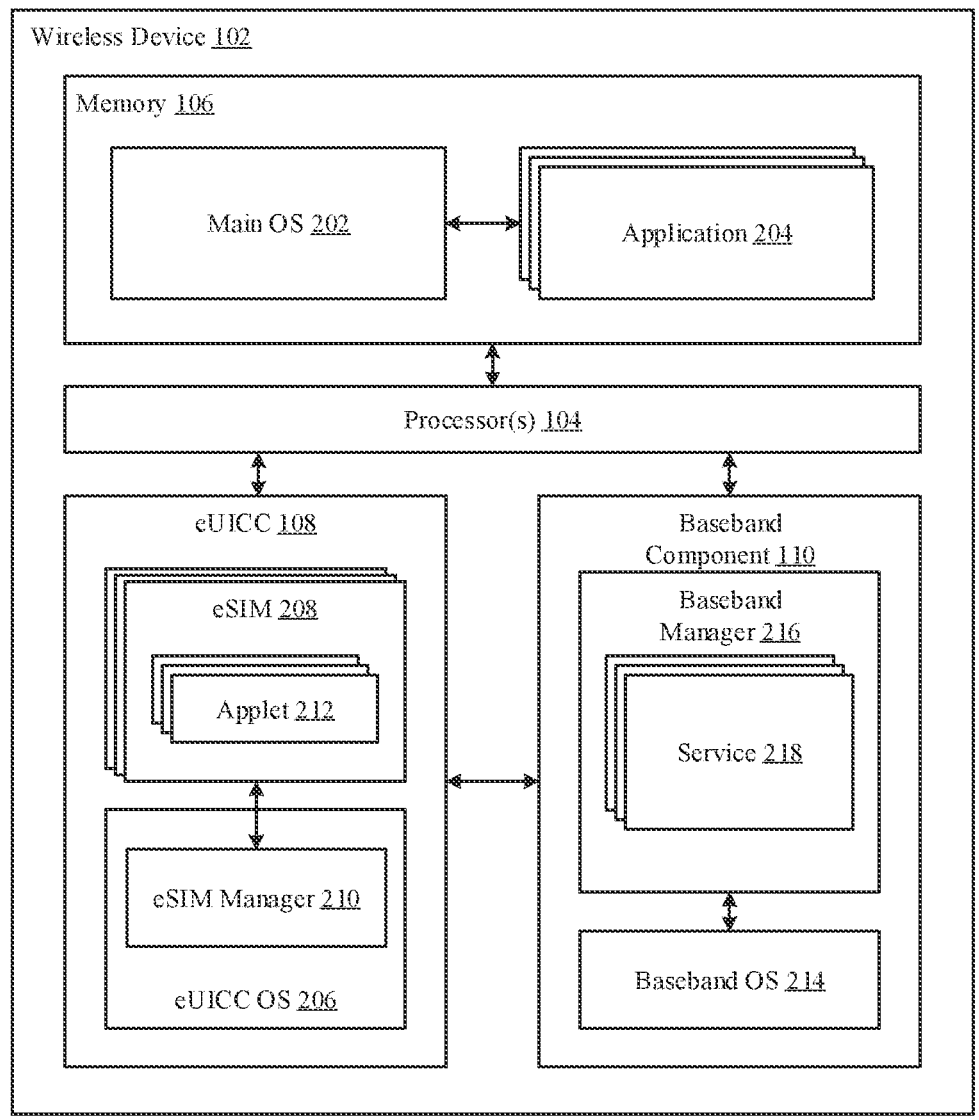
FIG. 2 illustrates a block diagram of a more detailed view of exemplary components of the system of FIG. 1, according to some embodiments.

FIG. 2 illustrates a block diagram 200 of a more detailed view of exemplary components of the system 100 of FIG. 1. The one or more processors 104, in conjunction with the memory 106, can implement a main operating system (OS) 202 that is configured to execute applications 204 (e.g., native OS applications and user applications). The one or more processors 104 can include applications processing circuitry and, in some embodiments, wireless communications control circuitry. The applications processing circuitry can monitor application requirements and usage to determine recommendations about communication connection properties, such as bandwidth and/or latency, and provide information to the communications control circuitry to determine suitable wireless connections for use by particular applications. The communications control circuitry can process information from the applications processing circuitry as well as from additional circuitry, such as the baseband component 110, and other sensors (not shown) to determine states of components of the wireless device 102, e.g., reduced power modes, as well as of the wireless device 102 as a whole, e.g., mobility states. The communications control circuitry, in some embodiments, can also determine whether the wireless device 102 can access particular RATs, such as access to 5G SA cellular connections. The wireless device 102 further includes an eUICC 108 that can be configured to implement an eUICC OS 206 to manage the hardware resources of the eUICC 108 (e.g., a processor and a memory embedded in the cUICC 108). The eUICC OS 206 can also be configured to manage eSIMs 208 that are stored by the cUICC 108, e.g., by enabling, disabling, modifying, updating, or otherwise performing management of the eSIMs 208 within the cUICC 108 and providing the baseband component 110 with access to the eSIMs 208 to provide access to wireless services for the wireless device 102. The cUICC OS 206 can include an eSIM manager 210, which can perform management functions for various eSIMs 208. Each eSIM 208 can include a number of applets 212 that define the manner in which the eSIM 208 operates. For example, one or more of the applets 212, when implemented by the baseband component 110 and the cUICC 108, can be configured to enable the wireless device 102 to communicate with an MNO 114 and provide useful features (e.g., phone calls and internet) to a user of the wireless device 102.

A baseband component 110 of the wireless device 102 can include a baseband OS 214 that is configured to manage hardware resources of the baseband component 110 (e.g., a processor, a memory, different radio components, etc.). According to some embodiments, the baseband component 110 can implement a baseband manager 216 that is configured to interface with the cUICC 108 to establish a secure channel with a provisioning server 116 and obtaining information (such as eSIM data) from the provisioning server 116 for purposes of managing eSIMs 208. The baseband manager 216 can be configured to implement services 218, which represents a collection of software modules that are instantiated by way of the various applets 212 of enabled eSIMs 208 that are included in the cUICC 108. For example, services 218 can be configured to manage different connections between the wireless device 102 and MNOs 114 according to the different eSIMs 208 that are enabled within the cUICC 108.

Figure 3A:
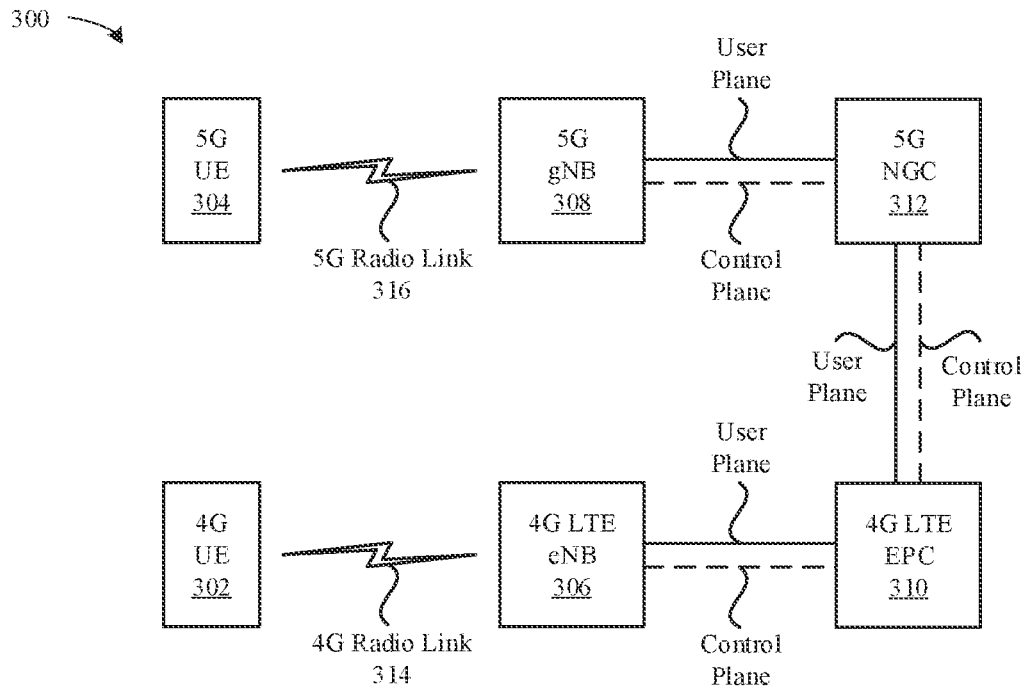
FIGS. 3A and 3B illustrate block diagrams of 5G non-standalone and standalone network architectures, according to some embodiments.
Figure 3B:
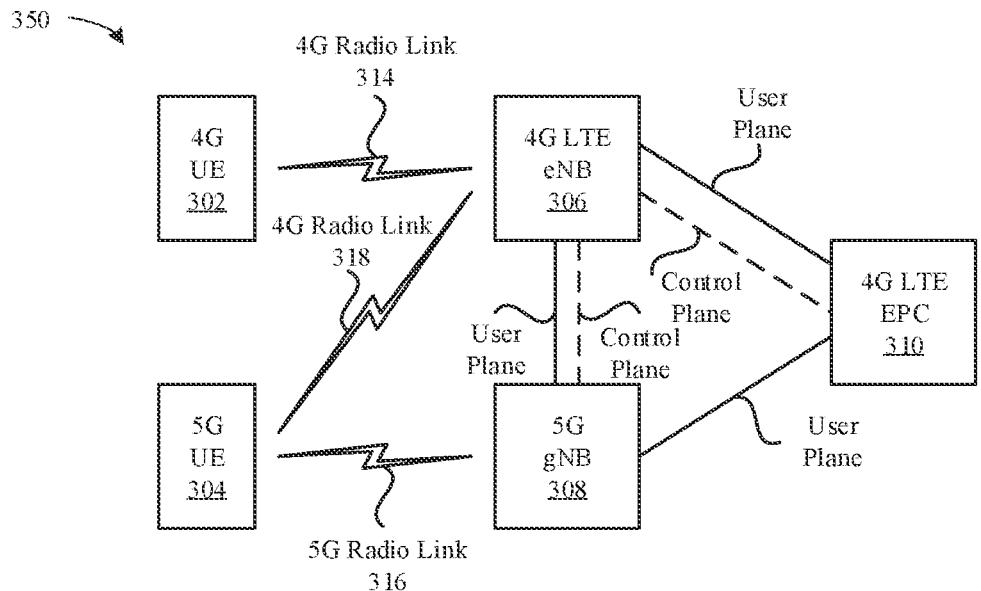

FIGS. 3A and 3B illustrate block diagrams 300/350 of 5G standalone (SA) and non-standalone (NSA) network architectures respectively. Operating in a SA mode, as shown in FIG. 3A, a 5G user equipment (UE) 304 communicates with a cellular wireless network via a 5G radio link 316 to a 5G gNB (base station) 308, while a 4G UE 302 separately communicates with its own cellular wireless network via a 4G radio link 314 to a 4G LTE eNB 306. The 5G gNB 308 is connected to a 5G next generation core (NGC) network 312 including both a user plane connection for data transfer and a control plane connection for control signaling. Similarly, the 4G LTE eNB 306 is connected to a 4G LTE enhanced packet core (EPC) 310. The 4G LTE EPC 310 network can interwork with the 5G NGC 312 network via user plane and control connections between them. 5G SA networks that include both 5G access networks based on 5G gNBs 308 and a 5G NGC 312, however, are expected to take multiple years to build out, and as such a hybrid network that includes elements of both a 4G cellular wireless network and a 5G cellular wireless network is planned for 5G UEs 304 to operate in an NSA mode as illustrated by FIG. 3B. Operating in a NSA mode, a 5G UE 304 communicates with a cellular wireless network via both a 5G radio link 316 to a 5G gNB 308 and via a separate 4G radio link 318 to a 4G LTE eNB 306. The 4G LTE eNB 306 can be used for control plane signaling and act as a primary node for access network connection with the 5G UE 304, while the 5G gNB 308 can be used for user plane data transfer and act as a secondary node for access network connection with the 5G UE 304. The 5G gNB 308 can transfer user plane data to the 4G LTE EPC 310 when directly connected to the 4G LTE EPC 310 or when indirectly connected to the 4G LTE EPC 310 via the 4G LTE 3NB 306, as indicated by the user plane connection between the 4G LTE eNB 306 and the 5G gNB 308. A 4G UE 302 (or a 5G UE 304 operating in a 4G LTE mode) can connect to the 4G LTE eNB 306 via the 4G radio link 314 for both control signaling and user plane data transfer.

5G cellular wireless networks will offer higher data throughput speeds and lower latency data connections that will enhance existing services and applications while enabling new applications and services that take advantage of the improved performance 5G network. Increased performance will also entail higher power consumption and increased requirements for thermal dissipation management. Cellular wireless networks for an MNO 114 can include both 5G and 4G network components that allow a 5G UE 304 to access wireless services i) via a 5G SA connection (e.g., using a 5G radio link 316 as shown in FIG. 3A), ii) via a 5G NSA connection (e.g., using a 5G radio link 316 in parallel with a 4G radio link 318 as shown in FIG. 3B), or iii) via a 4G LTE connection (e.g., using only a 4G radio link 318 and operating in a 4G LTE mode). In some circumstances, 5G NSA connections and/or 4G LTE connections can be preferred over 5G SA connections. In other cases, 5G SA connections can be preferred over 5G NSA connections and/or 4G LTE connections. As discussed further herein, the wireless device can implement dynamic RAT selection procedures to determine which RATs are available for the wireless device to use. Selection can be based on network performance and parameters measured and collected by the wireless device 102 as well as estimated network performance and known network parameters measured and collected by other wireless devices 102 and shared with the wireless device 102 via a network-based location database that collates and organizes crowd-sourced network information obtained from multiple wireless devices 102. In some embodiments, the wireless device 102 determines to disable a 5G SA capability of the wireless device 102 and fallback to a 5G NSA or 4G LTE configuration when performance via 5G NSA connections or via 4G LTE connections are likely to outperform a 5G SA connection.

Figure 4A:
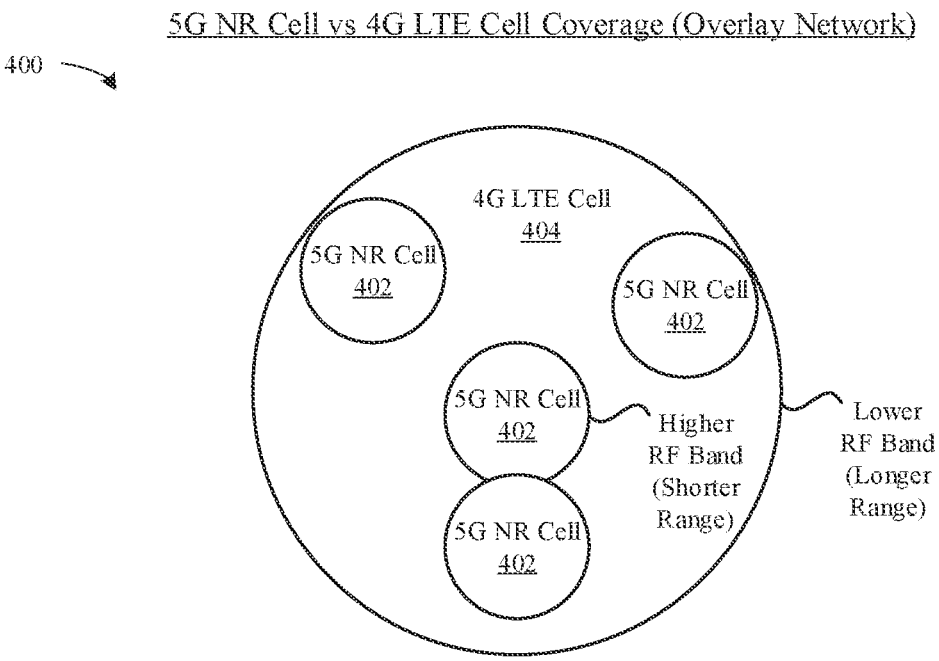
FIGS. 4A, 4B, and 4C illustrate examples of different types of cell coverage for cellular wireless networks that deploy multiple radio access technologies (RATs), according to some embodiments.

FIG. 4A illustrates a diagram 400 of an exemplary cellular wireless network in which multiple 5G new radio (NR) cells 402 are overlaid on a 4G LTE cell 404. The 5G NR cells 402 can use a radio frequency (RF) band that is higher in frequency than that of the 4G LTE cell 404 and can extend over a shorter range (distance) than the 4G LTE cell 404, which uses a lower RF band that has a higher coverage area. The 5G NR cells 402 can be installed at various times and complete overlapping coverage of 5G NR cells 402 with the 4G LTE cell 404 can be not achieved or require substantial investment and deployment over a period of time. At various geolocations, a 5G NR cell 402 may be not available to a wireless device 102. In addition, at some geolocations, a wireless device 102 may be operating at a far-range (peripheral edge) of a 5G NR cell 402 but within a mid-range to near-range of a 4G LTE cell 404 that the 5G NR cell 402 overlaps. Performance using a 4G LTE connection along to the 4G LTE cell 404 (in a 4G LTE mode) or using a 5G NSA connection with a 4G radio link in parallel with a 4G radio link may provide higher throughput (and/or other higher performance) than using a 5G SA connection with only a 5G radio link. The wireless device 102 can use crowd-sourced network performance and network parameter information for a geolocation at which the wireless device 102 is operating (and in some cases knowledge of network deployment configuration) to determine whether to enable/disable a 5G SA capability of the wireless device 102 in order to allow/disallow 5G SA connections.

Figure 4B:
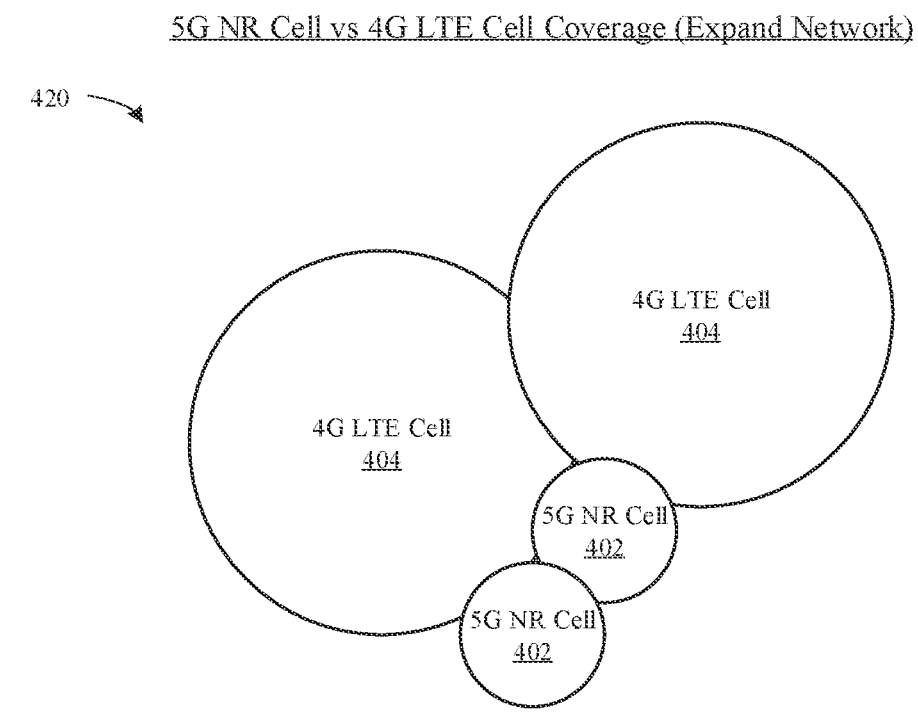

FIG. 4B illustrates a diagram 420 of another exemplary cellular wireless network in which multiple 5G NR cells 402 are partially overlaid with (or deployed in separate geographic areas from) 4G LTE cells 404, where the 5G NR cells 402 provide for network geographic coverage extension (as opposed to overlay in FIG. 4A). In this case, 5G SA connections can be preferred to 4G LTE connections when the wireless device 102 operates with a geographic area of the 5G NR cells 402, and a 5G NSA connection (which uses both 5G radio links and 4G LTE radio links) may not provide much additional performance, as the 4G LTE radio link would be at the far-range of the 4G LTE cell 404. The wireless device 102 can use knowledge of network deployment for particular MNO 114 to determine whether to enable/disable a 5G SA capability of the wireless device 102 in order to allow/disallow 5G SA connections.

Figure 4C:
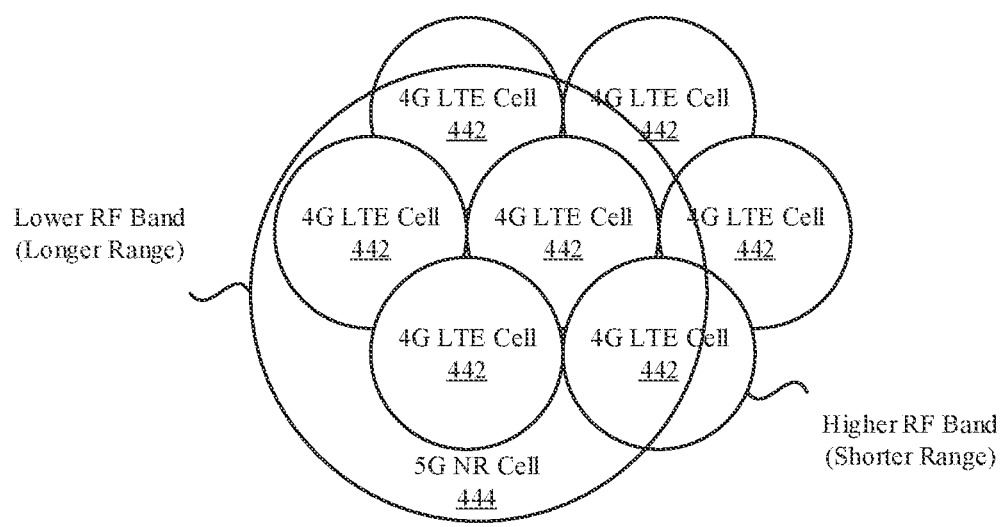

FIG. 4C illustrates a diagram 440 of another exemplary cellular wireless network in which a 5G NR cell 444 overlaps multiple 4G LTE cells 442. The 5G NR cell 444 uses a lower RF band with a longer geographic coverage range than the 4G LTE cells 442, which use a higher RF band with a shorter geographic coverage range. In this case the wireless device 102, whether to use a 5G SA connection to only the 5G NR cell 444 or a 5G NSA connection to both the 5G NR cell 444 and a 4G LTE cell 442 (or a 4G LTE connection to only a 4G LTE cell 442) can depend on where the wireless device 102 is located with the 5G NR cell and also relative to the center or edge of an available 4G LTE cell 442. The wireless device 102 can use knowledge of network deployment for particular MNO 114 along with crowd-sourced network performance and network parameter information for a geolocation at which the wireless device 102 is operating to determine whether to enable/disable a 5G SA capability of the wireless device 102 in order to allow/disallow 5G SA connections.

Figure 5:
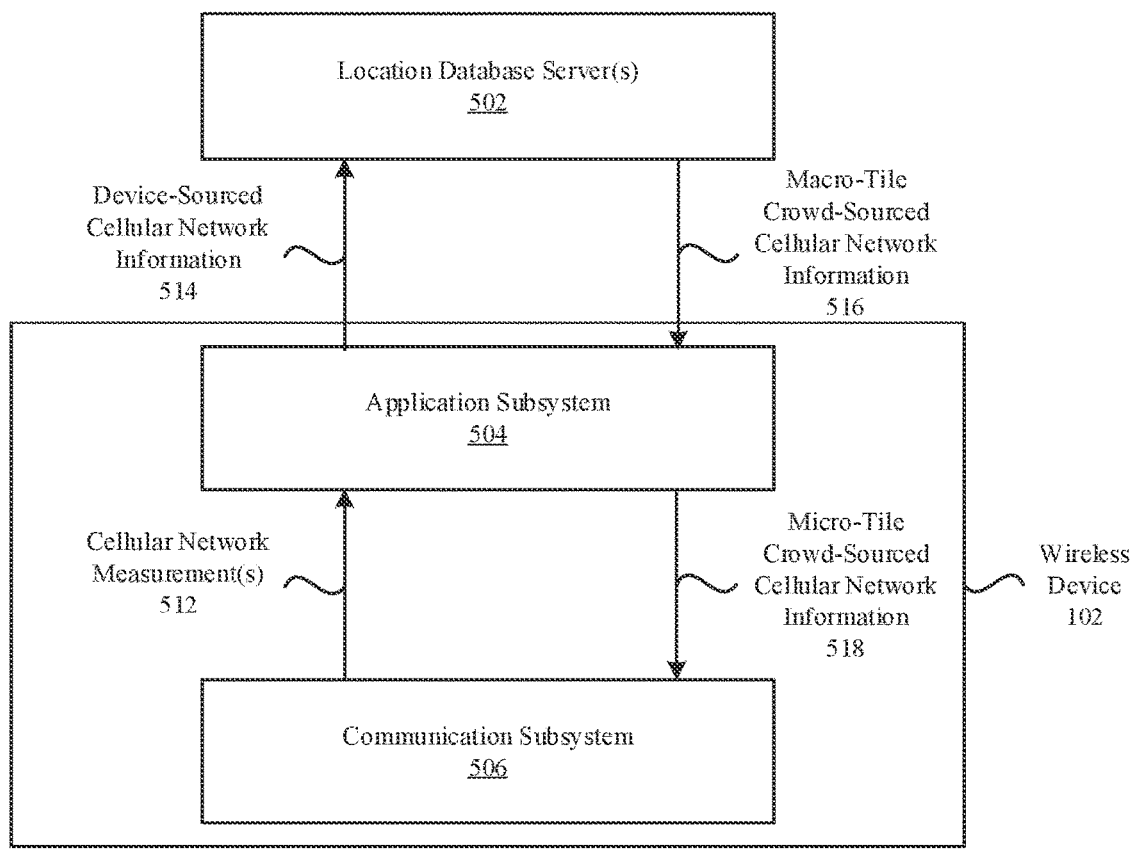
FIG. 5 illustrates a block diagram of communication of cellular wireless network information between a wireless device and location data base server(s), according to some embodiments.

FIG. 5 illustrates a diagram 500 of communication between a wireless device 102 and a set of one or more location database servers 502. The location database servers 502 can collate, analyze, and organize cellular wireless network information, e.g., performance data, network operating parameters, etc., sourced from multiple wireless devices 102. The location database servers 502 can maintain a location database accessible to and/or for which at least a part of the location database is downloaded to a wireless device 102. The location database can be organized into macro-tiles that include cellular network information crowd-sourced from multiple wireless devices 102, where a macro-tile can cover a geographic area, such as a 50 km by 50 km area, and each macro-tile can be subdivided into smaller geographic areas, such as a 500 meter by 500 meter area. A baseband component 110 of a communication subsystem 506 of the wireless device 102 can collect network performance data, such as a measured maximum throughput rate, for one or more cells of a particular cellular wireless network at a particular geolocation where the wireless device 102 is operating along with cellular wireless network operational parameters, such as RAT(s) used/available, RF band(s) used/available, RF bandwidths used/available, etc. The maximum throughput rate for the cells of the cellular wireless network can be estimated based on measured packet throughput in a downlink direction and/or in an uplink direction when a high throughput application is running, such as based on a speed test initiated by a user of the wireless device 102 or based on high data rate packet transfer for an application with a full buffer state at the wireless device 102. The cellular network measurements 512 can be provided to an application subsystem 504 that further processes and uploads the device-sourced cellular network information 514 to the location data base servers 502. The application subsystem 504 of the wireless device 102 can obtain crowd-sourced cellular network information 516, organized into macro-tiles, from the location database servers at regular intervals, e.g., weekly, while on a non-cellular wireless connection. The crowd-sourced cellular network information 516 can include up-to-date network snapshots that include both performance data collected by multiple wireless devices 102 and network operating information useful to the wireless device 102. Exemplary data included in the crowd-sourced cellular network information can include an RF bandwidth of primary and secondary cells for one or more RATs, such as for 5G radio links and 4G LTE radio links, and maximum throughput (average, median, and/or other statistics) rates for connections using different RAT types. The application subsystem 504 of the wireless device 102 provides to the communication subsystem 506 (e.g., to a baseband component 110 included therein) a micro-tile 518 of the crowd-sourced cellular network information covering a geolocation at which the wireless device 102 is operating. The baseband component 110 of the wireless device 102 can use the micro-tile 518 of crowd-sourced cellular network information to determine whether to enter/exit a dynamic RAT selection mode where a particular RAT (or set of RATs) can be allowed or disallowed for the wireless device 102. In some embodiments, the baseband component 110 of the communication subsystem 506 is triggered to request a micro-tile 518 of crowd-sourced cellular network information 518 from the application subsystem 504 based on a cell change or public land mobile network (PLMN) change events, e.g., when cell handover or cell reselection occurs. The baseband component 110 of the communication subsystem 506 can estimate performance of various connections, e.g., a 5G SA connection, a 5G NSA connection, and/or a 4G LTE connection, for the wireless device 102 using the micro-tile 518 of crowd-sourced cellular network information. In some embodiments, the wireless device 102 can use measurements of a serving cell and neighboring cells along with the crowd-sourced cellular network information from the location database to determine whether to enable or disable a dynamic RAT selection mode for the wireless device 102.

FIG. 6A illustrates a table 600 of an exemplary set of criteria which the wireless device 102 can use to determine whether to enter (or exit) a dynamic RAT selection mode. The exemplary set of criteria can also be used to determine whether to enable or disable access to different RAT connection types, such as whether a 5G SA connection is allowed or disallowed for the wireless device 102. The wireless device 102 can include user-controllable configurations for one or more cellular settings, including a smart data mode in which access to 5G cellular connections is managed based on application performance and device conditions (e.g., battery level, mobility state). In some embodiments, a smart data mode setting is enabled as a default option. In some embodiments, a smart data mode setting of enabled is required for a dynamic RAT selection mode to be used. The exemplary set of criteria can also include an indication of a bandwidth part (BWP) adaptation network configuration that allows a bandwidth of a 5G radio link to be configured to different bandwidths, e.g., 100 MHZ RF bandwidth versus 20 MHZ RF bandwidth, which allows for power saving to occur (using narrower RF bandwidths) when a higher data throughput of a wider bandwidth connection is not required. Without BWP adaptation, a wireless device 102 may be required to use a wider RF bandwidth than necessary, and switching to a different RAT, e.g., a 4G LTE connection that uses a narrower RF bandwidth, can be beneficial (save battery power of the wireless device 102) when the wider RF bandwidth of a 5G connection is not required. The wireless device 102 can also consider that presently used (starting) RAT as a dynamic RAT selection criterion, as the conditions for switching between RATs can depend on the particular RAT in use. The wireless device 102 can also consider the set of available RATs to which the wireless device 102 can switch. In some embodiments, one or more user-configurable settings at the wireless device 102 can determine whether particular RATs are available for use by the wireless device 102. The wireless device 102 can monitor applications to determine present (or future) requirements for high data throughput usage by one or more applications. The wireless device 102 can monitor for an RF bandwidth configuration indicating high bandwidth usage. The wireless device 102 can further detect whether particular applications, e.g., a personal hotspot application, are active (or initiating) that likely require high data throughput capability. Additional dynamic RAT selection criteria can include device configurations to use particular network features and/or network capabilities to provide particular features, such as a dual connectivity cellular network configuration that permits a 5G standalone (SA) connection to use parallel radio links over two different RF bands, e.g., within a lower frequency FR1 RF band and within a millimeter-wave, higher frequency RF band. The wireless device 102 can also account for whether a packet voice connection, e.g., a voice over IP (VOIP) or voice over IMS (VoIMS) connection is active to avoid interrupting the packet voice connection when changing between different available RATs. The wireless device 102 can also determine downlink and/or uplink performance (e.g., expected and/or measured) data throughput for using connections via different RATs to determine whether to switch between RATs. The wireless device 102 can also implement one or hysteresis timers to delay switching RATs too frequently to avoid ping-pong effects from changing back and forth between RATs.

FIG. 6B illustrates a first table 610 and a second table 620 of criteria the wireless device 102 can use to determine whether to enter a dynamic RAT selection mode when an initial (starting) RAT is a 5G SA RAT or when an initial RAT is a 5G NSA RAT or a 4G LTE RAT. When the wireless device 102 is presently connected via a 5G SA connection, the wireless device 102 can use the set of dynamic RAT selection entry criteria listed in table 610 to determine whether to switch to a 5G NSA connection or to a 4G LTE connection. In some embodiments, one or more of the entry criteria listed in table 610 are required for entry to the dynamic RAT selection mode. In particular, the wireless device 102 can enter the dynamic RAT selection mode only when a high throughput or high bandwidth is currently used or required by one or more applications of the wireless device 102, which can include enablement of a personal hot spot application, or when the wireless device 102 detects congestion on the presently used 5G SA cellular wireless network. In this case, the wireless device 102 determines that switching to a 5G NSA connection or a 4G LTE connection can be beneficial to throughput performance of the wireless device 102. The wireless device 102 can also require that i) a 5G SA dual connectivity not be configured for the 5G SA wireless network or for the wireless device 102 (where 5G SA dual connectivity provides an alternative for high throughput) and that ii) no packet voice connections for VoIP or VoIMS sessions are actively ongoing (to avoid interrupting active voice calls). The wireless device 102 can enter the dynamic RAT selection mode based on requirements for downlink or uplink throughputs, and one or more thresholds can be checked to determine whether switching RATs can be expected to provide sufficient improvement to warrant moving from a presently used RAT connection to a different RAT connection. When the wireless device 102 is presently connected via a 5G NSA connection (or via a 4G LTE connection), the wireless device 102 can enter a dynamic RAT selection mode and determine whether to switch to a 5G SA RAT when i) network congestion is detected on the presently used 5G NSA cellular wireless network or the 4G LTE cellular wireless network and ii) no network congestion is detected on the 5G SA cellular wireless network.

FIG. 6C illustrates a third table 630 and a fourth table 640 of criteria the wireless device 102 can use to determine whether to exit a dynamic RAT selection mode when an initial (starting) RAT is a 5G SA RAT or when an initial RAT is a 5G NSA RAT or a 4G LTE RAT. When the wireless device 102 has switched from an initial 5G SA RAT to a 5G NSA RAT (or 4G LTE RAT), the wireless device 102 can monitor whether the requirement for a high throughput or high bandwidth connection has ended or a personal hot spot application has been disabled. The wireless device 102 can also wait for a 4G LTE radio resource control (RRC) connection associated with use of the 5G NSA RAT or the 4G LTE RAT to be released and further wait for a hysteresis timer to expire (in some circumstances) before exiting the dynamic RAT selection mode and returning to the initial 5G SA RAT. When the wireless device 102 has switched from an initial 5G NSA RAT (or 4G LTE RAT) to a 5G SA RAT connection, the wireless device can exit the 5G dynamic RAT selection mode and return from the 5G SA RAT to a 5G NSA RAT connection (or to a 4G LTE only RAT connection) when the 5G SA RRC connection is in an idle state (indicating use of the 5G SA connection is no longer required) and after a hysteresis timer expires.

In some embodiments, the wireless device 102 controls entry and/or exit from the dynamic RAT selection mode by enabling or disabling a RAT capability, e.g., by enabling or disabling a 5G SA RAT capability (configuration) for the wireless device 102. In some embodiments, the wireless device 102 locally release a 5G SA connection and falls back to a 5G NSA connection or a 4G LTE connection. In some embodiments, the wireless device 102 refrains from sending an L2NR B1 measurement to the cellular wireless network, as the cellular wireless network may be unable to differentiate between a 5G SA connection and a 5G NSA connection.

Figure 7A:
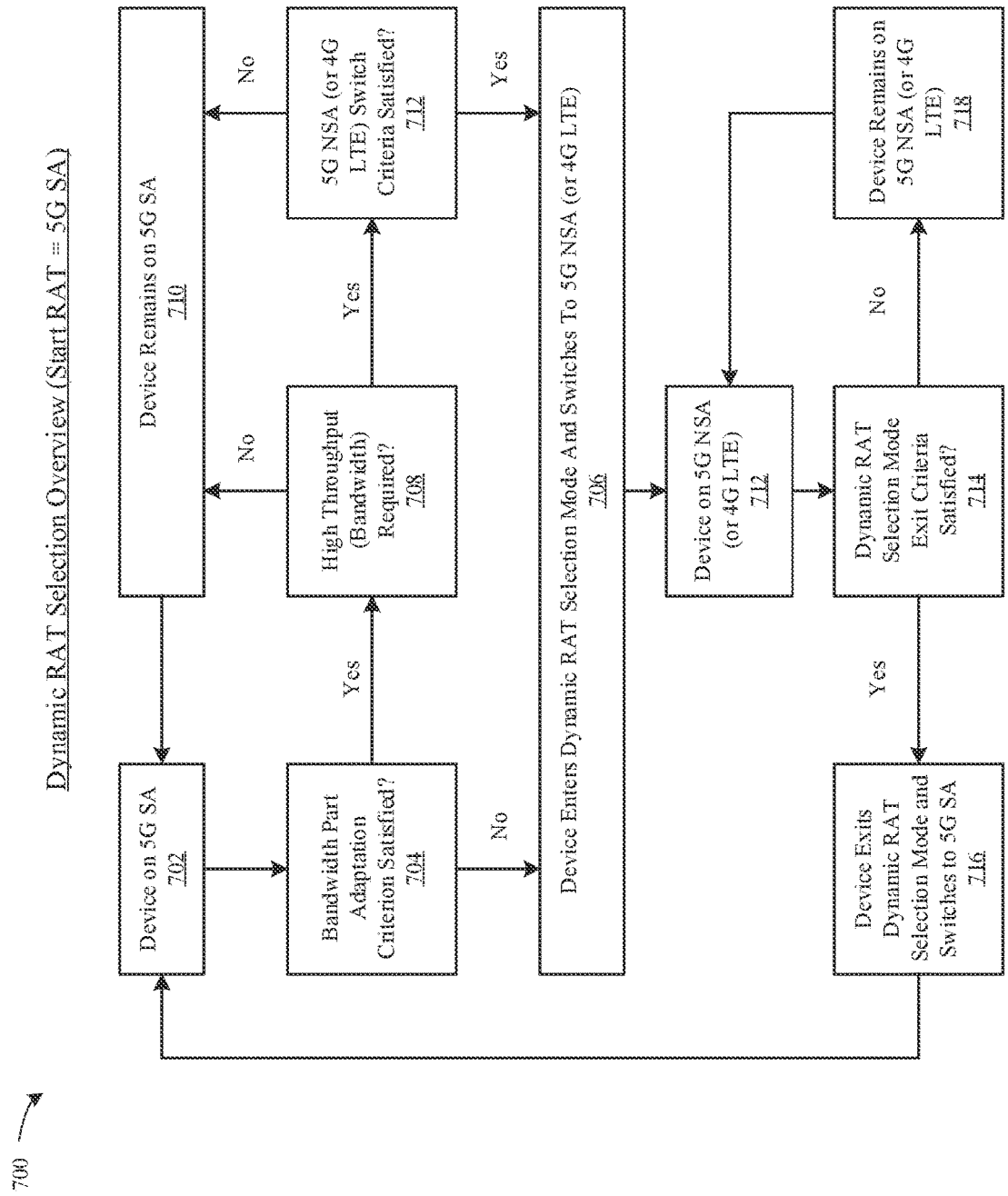
FIG. 7A illustrates a diagram of an overview of a dynamic RAT selection procedure when a starting RAT is a 5G standalone (SA) cellular wireless network, according to some embodiments.

FIG. 7A illustrates a diagram 700 of an overview of a dynamic RAT selection procedure, when a starting RAT is a 5G SA RAT. At 702, a wireless device 102 is connected to a cellular wireless network via a 5G SA RAT connection. At 704, the wireless device 102 determines whether the cellular wireless network supports a bandwidth part (BWP) adaptation criterion. When the cellular wireless network satisfies the BWP adaptation criterion, which can indicate that the cellular wireless network supports adaptive configurations of the BWP for the wireless device 102, the wireless device 102, at 708, determines whether a high throughput (or high bandwidth) requirement exists for the wireless device 102. For example, a high throughput application can be in use (or can be initiated) or a hot spot configuration for the wireless device 102 can be enabled. When no high throughput (or high bandwidth) application is required for the wireless device 102, the wireless device, at 710, remains on the 5G SA RAT connection. With adaptive bandwidth part configured and without a high throughput (or high bandwidth) requirement, the wireless device 102 can allow the cellular wireless network to adjust the bandwidth used while connected via the 5G SA RAT connection. When the bandwidth part adaptation criterion is satisfied and a high throughput (or high bandwidth) is required, the wireless device 102, at 712, can determine whether a set of one or more criteria for switching from the 5G SA RAT connection to a 5G NSA RAT connection (or to a 4G LTE RAT connection) are satisfied. When the switch criteria are not satisfied, the wireless device 102 remains on the 5G SA RAT connection. When the switch criteria are satisfied, or when the bandwidth part adaptation criterion is not satisfied, the wireless device 102, at 706, can enter a dynamic RAT selection mode and determine to switch to a 5G NSA RAT connection (or to a 4G LTE RAT connection). At 712, the wireless device 102 is connected to a cellular wireless network via a 5G NSA RAT connection (or via a 4G LTE RAT connection). At 714, the wireless device 102 determines whether a second set of one or more criteria for exiting from a dynamic RAT selection mode are satisfied. When the exit criteria are not satisfied the device, at 718, remains on the 5G NSA RAT connection (or the 4G LTE RAT connection). When the exit criteria are satisfied, the wireless device 102, at 716 exits the dynamic RAT selection mode and switches back to the 5G SA RAT connection. In some embodiments, the wireless device 102 transitions from a 5G SA RAT connection to a 5G NSA RAT connection (or a 4G LTE RAT connection) at least in part by disabling a device capability to use 5G SA connections and falls back to a 5G NSA connection or a 4G LTE connection. In some embodiments, the wireless device 102 transitions from a 5G NSA RAT connection (or a 4G LTE RAT connection) at least in part by re-enabling a device capability to use 5G SA connections. In some embodiments, the wireless device 102 can also locally release existing connections, e.g., 5G SA RAT connections, before establishing new connections, e.g., 5G NSA RAT connections (or 4G LTE RAT connections). In some embodiments, the wireless device 102 a radio resource control (RRC) connection to be released (or to change to an idle state) before performing a transition between different RAT connections.

Figure 7B:
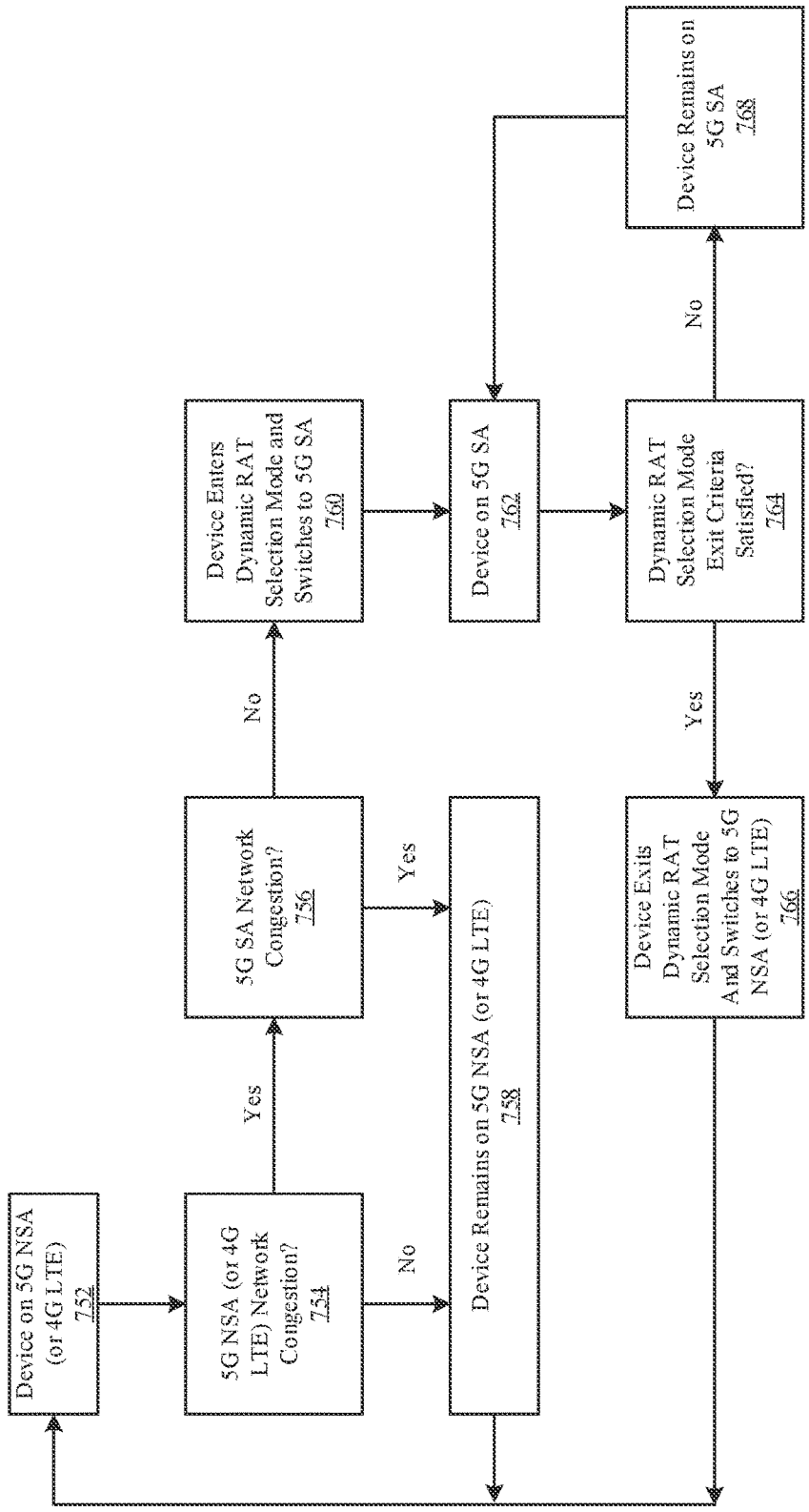
FIG. 7B illustrates a diagram of an overview of a dynamic RAT selection procedure when a starting RAT is a 5G non-standalone (NSA) cellular wireless network or a 4G LTE cellular wireless network, according to some embodiments.

FIG. 7B illustrates a diagram 750 of an overview of a dynamic RAT selection procedure, when a starting RAT is a 5G NSA RAT (or a 4G LTE RAT). At 752, the wireless device 102 is connected to a cellular wireless network via a 5G NSA RAT connection (or a 4G LTE RAT connection). At 754, the wireless device determines whether the cellular wireless network to which it is connected is experiencing network congestion, which can impede throughput performance for the wireless device 102. When the wireless device 102 detects congestion on the 5G NSA cellular wireless network (or the 4G LTE cellular wireless network), the wireless device 102, at 756, determines when a 5G SA cellular wireless network (to which the wireless device 102 could switch connections) is also experiencing a network congestion condition. When both the present (5G NSA or 4G LTE) cellular wireless network and the additional 5G SA cellular wireless network are congested (or when the present 5G NSA or 4G LTE cellular wireless network is not congested), the wireless device 102, at 758, remains connected via the 5G NSA RAT connection (or the 4G LTE RAT connection). When the present (5G NSA or 4G LTE) cellular wireless network is congested and the 5G SA cellular wireless network is not congested, the wireless device 102, at 760, enters the dynamic RAT selection mode and switches to the 5G SA cellular wireless network. At 762, the wireless device 102 is connected via a 5G SA connection. At 764, the wireless device 102 evaluates a set of dynamic RAT selection mode exit criteria are satisfied. When the exit criteria are not satisfied, the wireless device 102 remains connected via the 5G SA connection. When the exit criteria are satisfied, the wireless device 102, at 766, exits the dynamic RAT selection mode and switches back to the 5G NSA (or 4G LTE) connection.

Figure 8A:
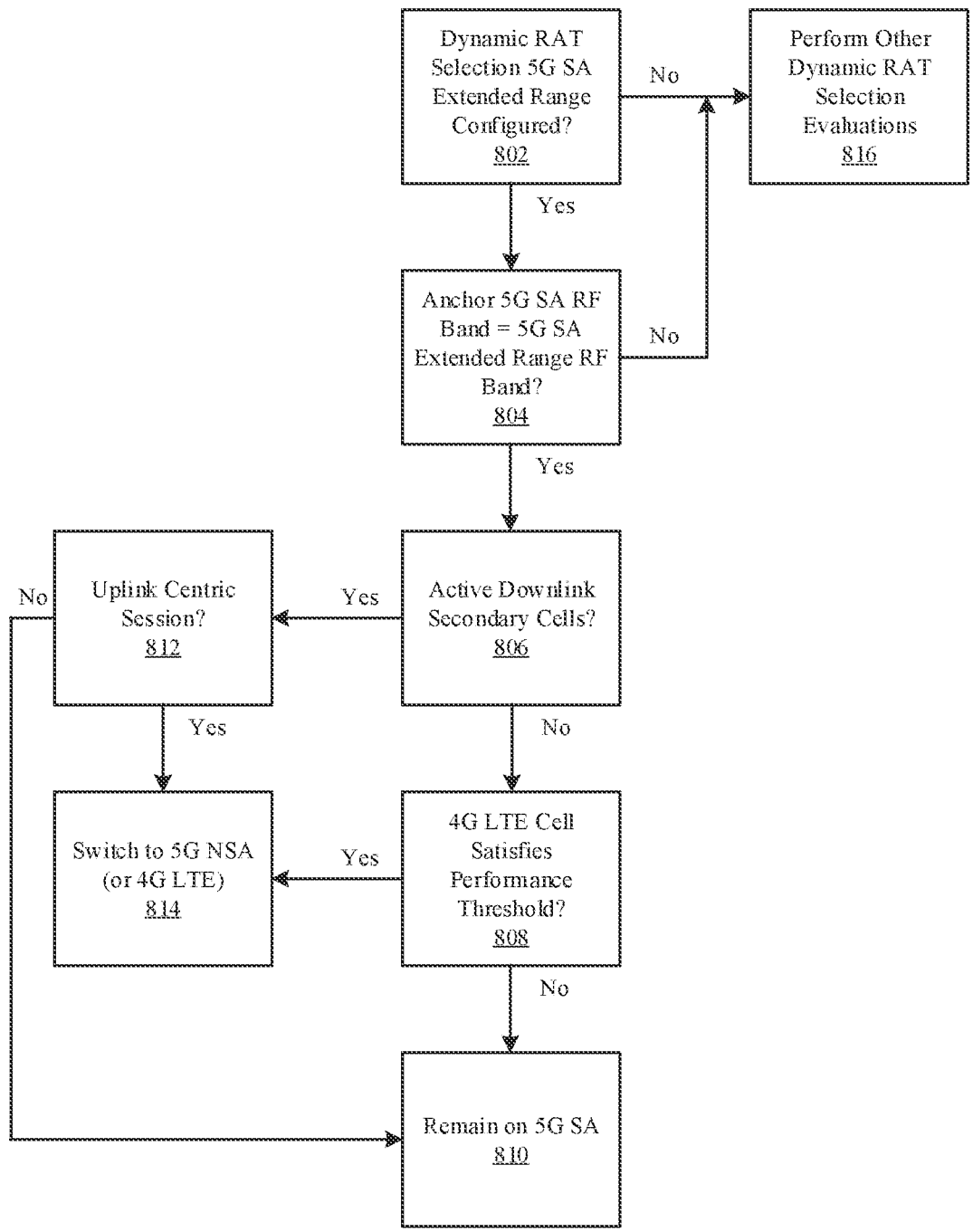
FIGS. 8A, 8B, 8C, 8D, 8E, and 8F illustrate block diagrams of exemplary call flows for a dynamic RAT selection procedure under different cellular wireless network configurations, according to some embodiments.

FIG. 8A illustrates a flowchart 800 of a dynamic RAT selection call flow for a wireless device 102 connected via a 5G SA connection to a cellular wireless network in which 5G NR cells 444 extend for a longer range (penetrate further to provide better coverage) than 4G LTE cells 442. An RF band used by the 5G NR cells 444, e.g., an N28 band, can be at lower frequencies than an RF band used by the 4G LTE cells 442. The wireless device 102 can include information regarding the cellular wireless network, which can be provided in a configuration file that characterizes one or more parameters and settings for use by the wireless device 102 to access services of the cellular wireless network. The information can include radio frequencies used by different RAT cells of the cellular wireless network. In some embodiments, the information can also include an indication of extended range capability for 5G SA cells over 4G LTE cells. At 802, the wireless device 102 determines whether a 5G SA extended range for dynamic RAT selection is configured for the cellular wireless network. When a dynamic RAT selection 5G SA extended range is not configured for the cellular wireless network, the wireless device 102, at 816, can proceed to other dynamic RAT selection evaluations (e.g., one or more of those illustrated in FIGS. 8B through 8F and described further herein). When the dynamic RAT selection 5G SA extended range is configured for the cellular wireless network, the wireless device 102, at 804, determines whether an RF band used as an anchor leg of the 5G SA connection is an RF band that corresponds to a 5G SA extended range RF band. For example, is the anchor leg of the 5G SA connection using a lower frequency, extended range RF band? When the anchor 5G SA RF band is not a 5G SA extended range RF band, the wireless device 102, at 816, proceeds to other dynamic RAT selection evaluations. When the anchor 5G RF band is a 5G extended range RF band, the wireless device 102, at 806, determines whether there are any active downlink (DL) connections to secondary cells for the wireless device 102, e.g., is carrier aggregation in the downlink direction in use. When there are active downlink secondary cells for carrier aggregation in use, the wireless device, at 812, determines whether the current communication session is an uplink (UL) centric session, e.g., is high throughput or high bandwidth required in the UL direction for an application in use (or scheduled for use) by the wireless device 102. When the communication session is not an UL centric session and carrier aggregation is in use for the DL direction, the wireless device 102, at 810, remains connected to the cellular wireless network via the 5G SA connection. When the communication session is an UL centric session and carrier aggregation is in use for the DL direction, the wireless device 102, at 814, switches from the 5G SA connection to a 5G NSA connection (or to a 4G LTE connection). When carrier aggregation is not in use for the DL direction, the wireless device 102, at 808, determines whether an available 4G LTE cell satisfies one or more performance thresholds to switch RATs. When no available 4G LTE cell satisfies the one or more performance thresholds for switching RATs, the wireless device 102, at 810, remains connected to the cellular wireless network via the 5G SA connection. When the 4G LTE cell satisfies the one or more performance thresholds for switching RATs, the wireless device 102, at 814, switches from the 5G SA connection to a 5G NSA connection (or to a 4G LTE connection).

Figure 8B:
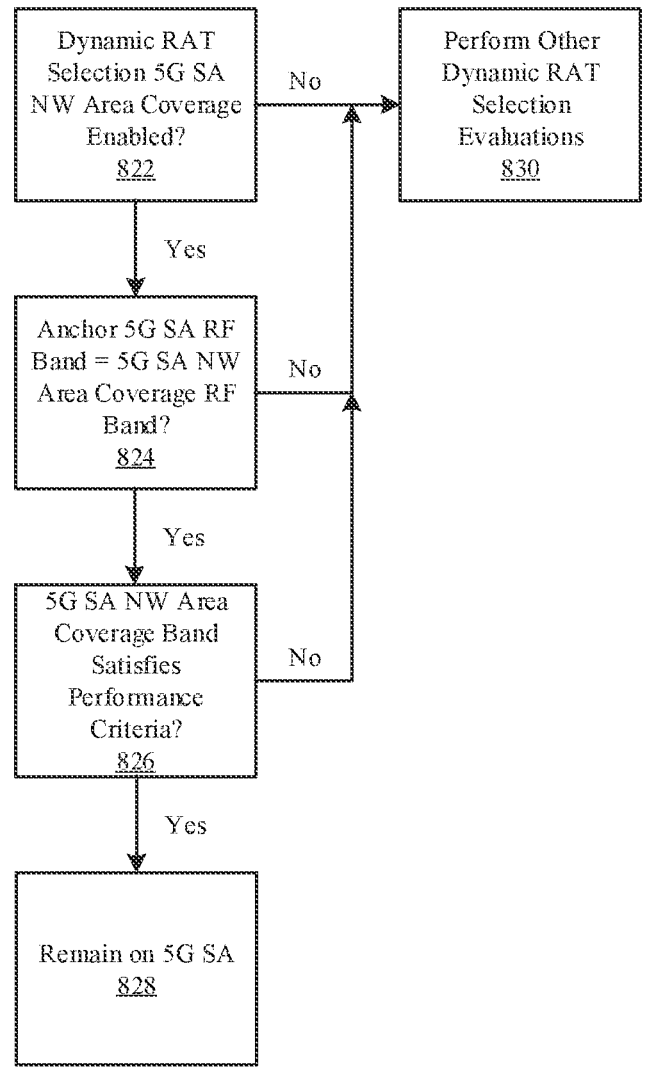

FIG. 8B illustrates a flowchart 820 for a dynamic RAT selection call flow for a wireless device 102 connected via a 5G SA connection to a cellular wireless network in which 5G NR cells 402 are used to provide additional coverage to 4G LTE cells 404. The wireless device 102 can include information regarding the cellular wireless network, which can be provided in a configuration file that characterizes one or more parameters and settings for use by the wireless device 102 to access services of the cellular wireless network. The information can include radio frequencies used by different RAT cells of the cellular wireless network. In some embodiments, the information can also include an indication that 5G NR cells are deployed to provide additional network area coverage to 4G LTE cells of the cellular wireless network. At 822, the wireless device 102 determines whether an indication of 5G SA network area coverage is enabled for the cellular wireless network. When the cellular wireless network is not configured with 5G NR cells 402 to provide supplemental geographic area coverage, the wireless device 102 can proceed, at 830, to perform other dynamic RAT selection evaluations. When the cellular wireless network to which the wireless device 102 is connected via a 5G SA connection is configured with deployment of 5G NR cells 402 as additional area coverage, the wireless device 102, at 824, determines whether an RF band used as an anchor leg of the 5G SA connection is an RF band that corresponds to a 5G SA network area coverage RF band. When the anchor leg of the 5G SA connection is not an RF band that corresponds to a 5G SA network area coverage RF band, the wireless device 102 can proceed at 830, to perform other dynamic RAT selection evaluations. When the anchor leg of the 5G SA connection is an RF band that corresponds to a 5G SA network area coverage RF band, the wireless device 102, at 826, determines whether the 5G SA network area coverage band used as an anchor leg of the 5G SA connection satisfies one or more performance criteria. When the performance criteria are satisfied, the wireless device 102, at 828, remains connected to the cellular wireless network via the 5G SA connection. When the performance criteria are not satisfied, the wireless device, at 830, can proceed to perform other dynamic RAT selection evaluations. A 5G SA connection to a 5G NR cell 402 in a geographic area where the 5G NR cell 402 provides network coverage (and alternative RAT cells may be unavailable or with weak coverage) does not warrant switching to an alternative RAT connection unless additional criteria are met, which can be determined using additional dynamic RAT selection evaluations.

Figure 8C:
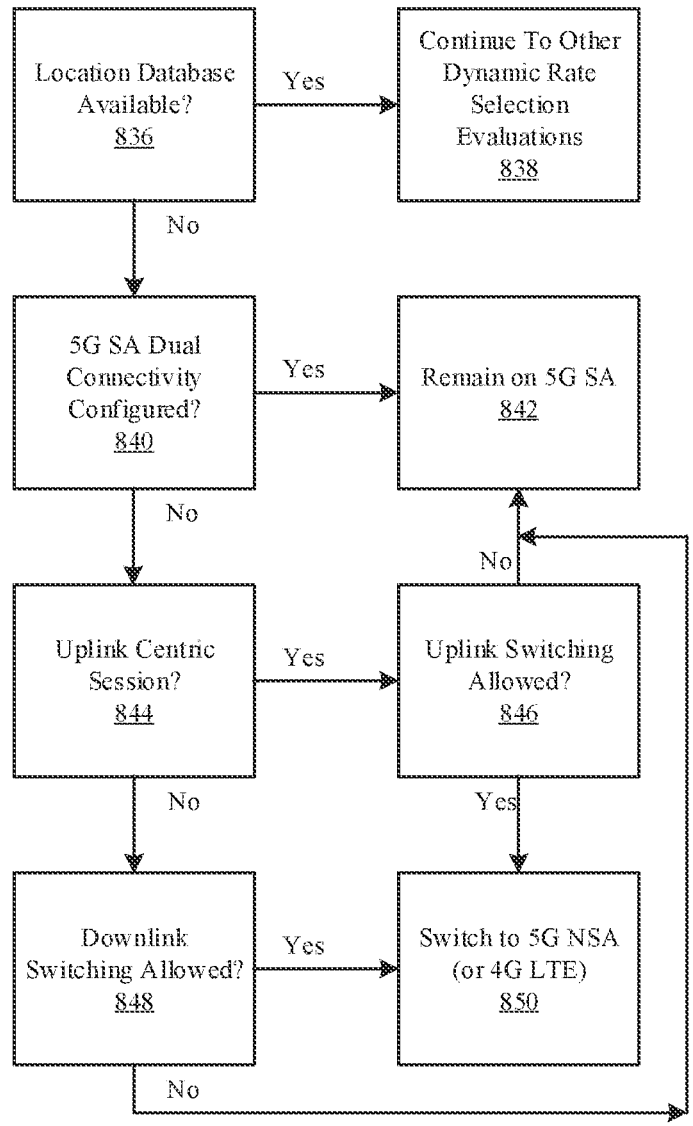

FIG. 8C illustrates a flowchart 820 for a dynamic RAT selection call flow for a wireless device 102 when location database crowd-sourced network performance information for a cellular network to which the wireless device 102 is connected is unavailable (or for which the information has insufficient sample data points to meet a reliability metric). At 836, the wireless device 102 determines whether reliable crowd-sourced network performance information for a cellular wireless network, with which the wireless device 102 is connected via a 5G SA connection, is available from a micro-tile of a location database, the micro-tile corresponding to a geolocation at the wireless device 102 is operating. When location database information is available, at 838, the wireless device 102 proceeds to other dynamic RAT selection evaluations. When location database information is not available, the wireless device 102, at 840, determines whether 5G SA dual connectivity, which allows for parallel use of a lower frequency FR1 band and a higher frequency millimeter wave RF band for a 5G SA connection, is configured. When 5G SA dual connectivity is configured, the wireless device 102, at 842, remains connected to the cellular wireless network via the 5G SA connection. When 5G SA dual connectivity is not configured and location database information is available, the wireless device 102, at 844, determines whether the current communication session is an uplink (UL) centric session, e.g., is high throughput or high bandwidth required in the UL direction for an application in use (or scheduled for use) by the wireless device 102. When the current communication session is an UL centric session, the wireless device 102, at 846, determines whether uplink switching is allowed, e.g., based on a device configuration. When the uplink switching is allowed and the current communication session is an UL centric session, the wireless device 102, at 850, switches to a 5G NSA connection (or a 4G LTE connection) with the cellular wireless network. When the uplink switching is not allowed and the current communication session is an UL centric session, the wireless device 102, at 842, remains connected to the cellular wireless network via the 5G SA connection. When the current communication session is not an UL centric session, the wireless device 102, at 848, determines whether downlink switching is allowed, e.g., based on a device configuration. When downlink switching is not allowed and the current communication session is a DL centric session, the wireless device 102, at 842, remains connected to the cellular wireless network via the 5G SA connection. When downlink switching is allowed and the current communication session is a DL centric session, the wireless device 102, at 850, switches to a 5G NSA connection (or a 4G LTE connection) with the cellular wireless network.

Figure 8D:
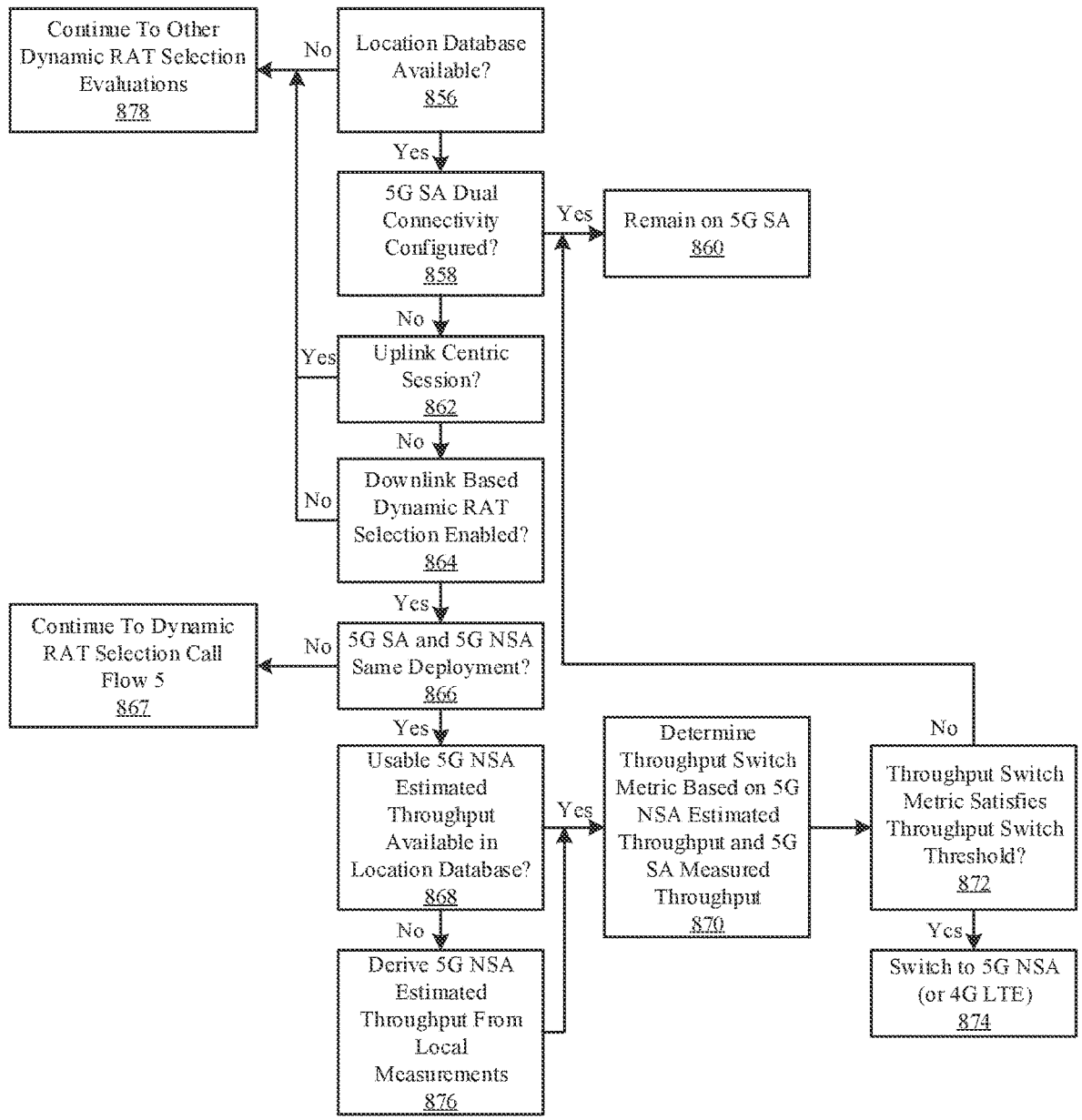

FIG. 8D illustrates a flowchart 855 of a dynamic RAT selection call flow for a downlink centric session with reliable location database information available at a geolocation where the wireless device 102 is operating for a cellular wireless network to which the wireless device 102 is connected via a 5G SA connection. In addition, for the call flow of FIG. 8D, a 5G SA connection and a 5G NSA connection to the cellular wireless network would use the same RF band and bandwidth for 5G radio links. A difference between a 5G SA connection and a 5G NSA connection for the wireless device 102 to the cellular wireless network would be due to a 4G LTE connection, which can be used as an anchor leg for a 5G NSA connection. At 856, the wireless device 102 determines whether reliable crowd-sourced network performance information for a cellular wireless network, with which the wireless device 102 is connected via a 5G SA connection, is available from a micro-tile of a location database, the micro-tile corresponding to a geolocation at the wireless device 102 is operating. When location database information is not available, at 878, the wireless device 102 proceeds to other dynamic RAT selection evaluations. When location database information is available, the wireless device 102, at 858, determines whether 5G SA dual connectivity, which allows for parallel use of a lower frequency FR1 band and a higher frequency millimeter wave RF band for a 5G SA connection, is configured. When 5G SA dual connectivity is configured, the wireless device 102, at 860, remains connected to the cellular wireless network via the 5G SA connection. When 5G SA dual connectivity is not configures, the wireless device 102, at 862, determines whether the current communication session is an uplink (UL) centric session, e.g., is high throughput or high bandwidth required in the UL direction for an application in use (or scheduled for use) by the wireless device 102. When the current communication session is an UL centric session, the wireless device 102, at 878, can continue to perform other dynamic RAT selection evaluations. When the communication session is not an UL centric session, the wireless device, at 864, determines whether a downlink based dynamic RAT selection feature is enabled for the wireless device 102. When downlink based dynamic RAT selection is not enabled, the wireless device 102, at 878, continues to other dynamic RAT selection evaluations. When the downlink based dynamic RAT selection feature is enabled, the wireless device 102, at 866 determines whether 5G SA and 5G NSA deployments for the cellular wireless network, at least at the present geolocation where the wireless device 102 is operating, are the same, in which case 5G SA connections and 5G NSA connections will differ only in the addition of a 4G LTE radio link for a 5G NSA connection. When the 5G SA and 5G NSA deployments are not the same, the wireless device 102, at 867, continues to the dynamic RAT selection call flow illustrated in FIG. 8E. When the 5G SA and 5G NSA deployments are the same, the wireless device 102, at 868, determines whether a usable (e.g., available and reliable) 5G NSA throughput estimate is available (or derivable) from cellular wireless network information, for a micro-tile that includes a geolocation at which the wireless device 102 is operating, in the crowd-sourced network performance information of the location database. When throughput estimates for 5G NSA connections are not available or not reliable, the wireless device 102, at 876, derives an estimate of throughput performance for a 5G NSA connection to the cellular wireless network based on measurements locally obtained by the wireless device 102, e.g., by measuring signal strength and/or signal quality of available cells that may be used by the wireless device 102 for a 5G NSA connection. In some embodiments, the wireless device 102 determines a secondary cell group (SCG) throughput and a corresponding SA throughput, e.g., based on internal monitoring of data throughput by the wireless device 102 for different cellular wireless connections. In some embodiments, the wireless device 102 derives a real-time 5G SA throughput rate. In some embodiments, the wireless device 102 derives a master cell group (MCG) throughput estimate using a signal strength (e.g., reference signal received power, RSRP) and RF bandwidth information of 4G LTE carriers. The wireless device 102, at 870, determines a throughput switch metric based on an estimated throughput for a 5G NSA connection and a measured throughput for a 5G SA connection. In some embodiments, the wireless device 102 determines a percentage difference between a measured 5G SA throughput and an estimated 5G NSA (or 4G LTE) throughput. In some embodiments, the wireless device 102 accounts for a configuration of RF bins used to determine the throughput switch metric and/or to adjust a throughput switch threshold. In some embodiments, the wireless device 102 compares the percentage difference in throughput for 5G SA connections and 5G NSA connections (or 4G LTE connections) to a percentage threshold (as the throughput switch threshold). In some embodiments, the wireless device 102 requires at least a certain percentage increase in throughput performance to allow for switching from the 5G SA connection to a 5G NSA connection (or to a 4G LTE connection). At 870, the wireless device 102 determines whether the throughput switch metric satisfies a throughput switch threshold to switch from the 5G SA connection to a 5G NSA connection (or a 4G LTE connection). When the throughput switch metric satisfies the throughput switch threshold, the wireless device 102, at 874 switches to a 5G NSA connection (or a 4G LTE connection) with the cellular wireless network. When the throughput switch metric does not satisfy the throughput switch threshold, the wireless device 102, at 860, remains connected to the cellular wireless network via the 5G SA connection.

Figure 8E:
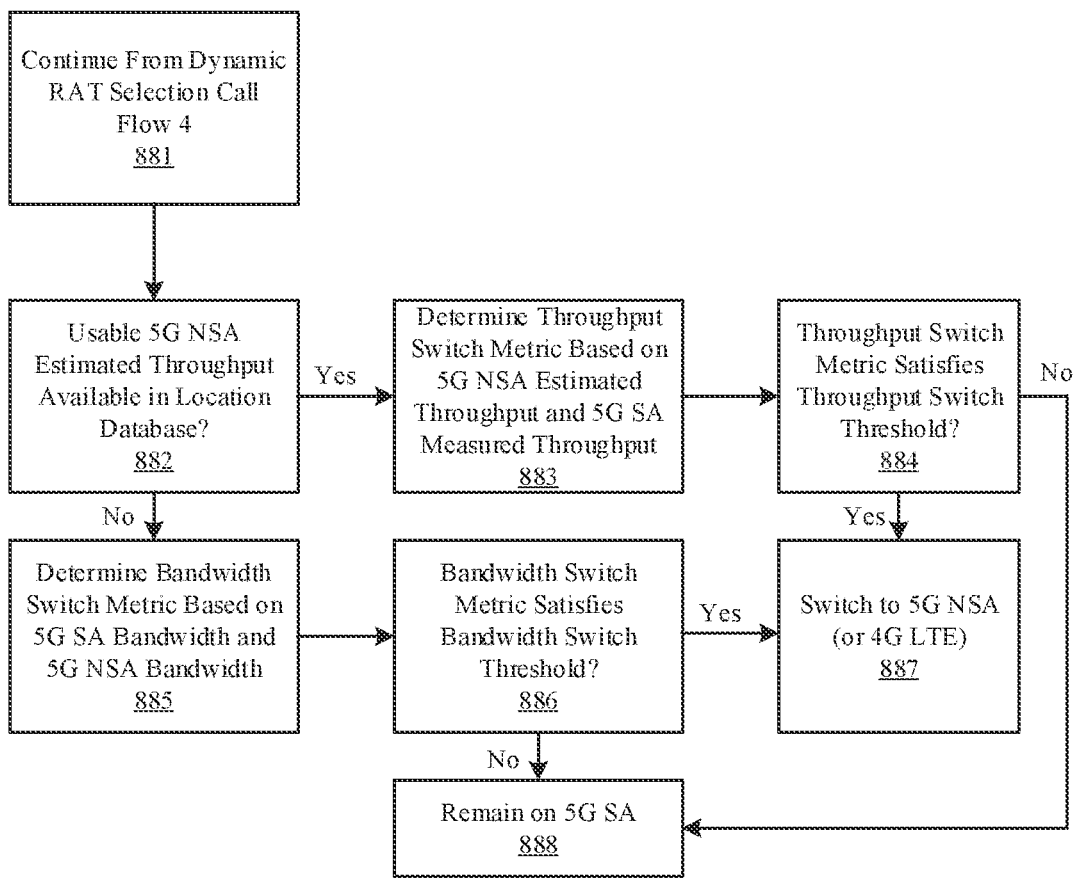

FIG. 8E illustrates a flowchart 880 of a dynamic RAT selection call flow for a downlink centric session, where reliable location database information for a cellular wireless network is available at a geolocation where the wireless device 102 is operating, and the wireless device 102 is connected via a 5G SA connection. In addition, for the call flow of FIG. 8E, a 5G SA connection and a 5G NSA connection to the cellular wireless network do not use the same RF band and bandwidth for 5G radio links, e.g., the 5G SA and 5G NSA network deployments are different. The wireless device 102, at 881, continues from the dynamic RAT selection call flow illustrated in FIG. 8D, i.e., the conditions tested at 856, 858, 862, 864, and 866 have occurred with particular outcomes that lead to using the dynamic RAT selection call flow of FIG. 8E. At 882, the wireless device 102 determines whether a usable (e.g., available and reliable) 5G NSA throughput estimate is available (or derivable) from cellular wireless network information, for a micro-tile that includes a geolocation at which the wireless device 102 is operating, in the crowd-sourced network performance information of the location database. When throughput estimates for 5G NSA connections are not available or not reliable, the wireless device 102, at 885, determines a bandwidth switch metric based on an RF bandwidth for 5G SA connections and an RF bandwidth for 5G NSA connections to the cellular wireless network. At 886, the wireless device 102 determines whether the bandwidth switch metric satisfies a bandwidth switch threshold. In some embodiments, the wireless device 102 compares total bandwidth for a 5G NSA connection (which includes a parallel 4G LTE connection) to a total bandwidth for a 5G SA connection (which does not include a parallel 4G LTE connection). In the case of FIG. 8D, the 5G SA and 5G NSA deployments are the same, so total bandwidth for 5G SA and 5G NSA connections would differ only by the addition of parallel 4G LTE connections. In the case of FIG. 8E, however, the 5G SA and 5G NSA deployments are not the same, and therefore total bandwidths of the 5G SA and 5G NSA connections are compared to determine additional bandwidth available via 5G NSA connections exceeds 5G SA connections by a bandwidth threshold. In some embodiments, percentage differences in bandwidth are used to compare 5G SA and 5G NSA connections. In some embodiments, absolute amounts of RF bandwidth are used to compare 5G and 5G NSA connections. When the bandwidth switch threshold is satisfied, the wireless device 102, at 887, switches from the 5G SA connection to a 5G NSA connection (or a 4G LTE connection). When the bandwidth switch threshold is not satisfied, the wireless device 102, at 888, remains connected to the cellular wireless network via the 5G SA connection. When reliable throughput estimates for 5G NSA connections to the cellular wireless network are available from the crowd-sourced network performance information of the location database, the wireless device 102, at 883, determines a throughput switch metric based on an estimated throughput for a 5G NSA connection and a measured throughput for a 5G SA connection. In some embodiments, the wireless device 102 calculates a percentage different in throughput between 5G SA connections and 5G NSA connections. In some embodiments, the wireless device 102 determines a throughput switch metric using frequency bandwidth information for the 5G SA connections and 5G NSA connections to adjust an absolute throughput switch metric value for 5G SA throughput. When the throughput switch metric, e.g., a percentage difference in throughput between a 5G NSA connection (or 4G LTE connection) and a 5G SA connection, satisfies (e.g., exceeds) the throughput switch threshold, the wireless device 102, at 887, switches from the 5G SA connection to a 5G NSA connection (or a 4G LTE connection). When the throughput switch metric is not satisfied, the wireless device 102, at 888, remains connected to the cellular wireless network via the 5G SA connection.

Figure 8F:
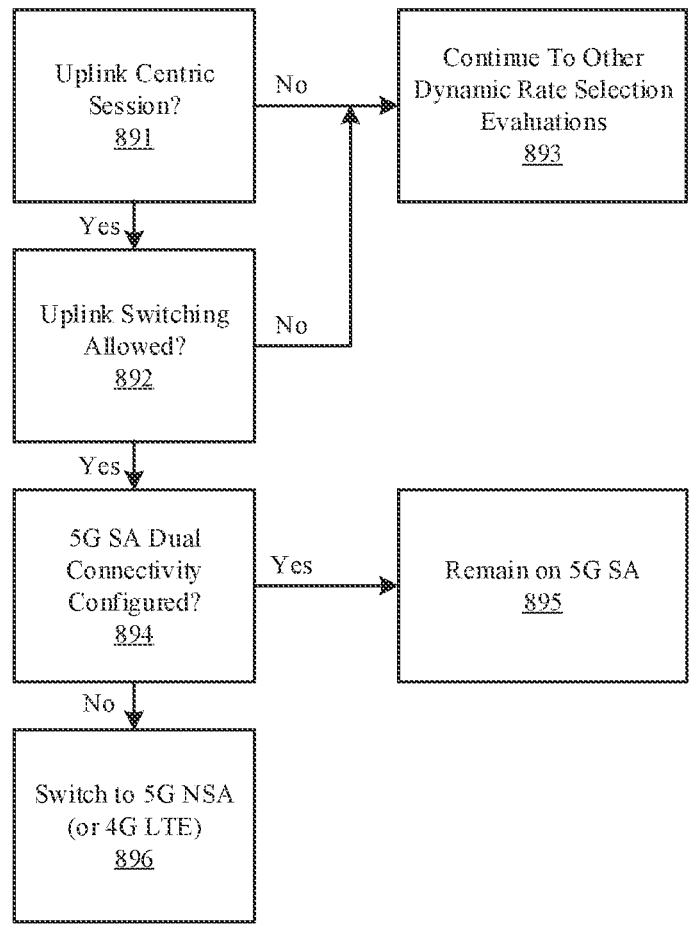

FIG. 8F illustrates a flowchart 890 of a dynamic RAT selection call flow for an uplink centric communication session where reliable location database information for a cellular wireless network is available at a geolocation where the wireless device 102 is operating, and the wireless device 102 is connected via a 5G SA connection. At 891, the wireless device 102 determines whether the 5G SA connection to the cellular wireless network is for an uplink centric communication session, e.g., is high throughput or high bandwidth required in the UL direction for an application in use (or scheduled for use) by the wireless device 102. When the current communication session is not an UL centric session, the wireless device 102, at 893, can continue to perform other dynamic RAT selection evaluations. When the communication session is an UL centric session, the wireless device, at 892, determines whether uplink switching is allowed, e.g., based on a device configuration. When uplink switching is not allowed, the wireless device 102, at 893, can continue to perform other dynamic RAT selection evaluations. When the uplink switching is allowed, the wireless device 102, at 894, determines whether 5G SA dual connectivity, which allows for parallel use of a lower frequency FR1 band and a higher frequency millimeter wave RF band for a 5G SA connection, is configured. When 5G SA dual connectivity is configured, the wireless device 102, at 895, remains connected to the cellular wireless network via the 5G SA connection. When 5G SA dual connectivity is not configured, the wireless device 102, at 896, switches from the 5G SA connection to a 5G NSA connection (or a 4G LTE connection).

Figure 9A:
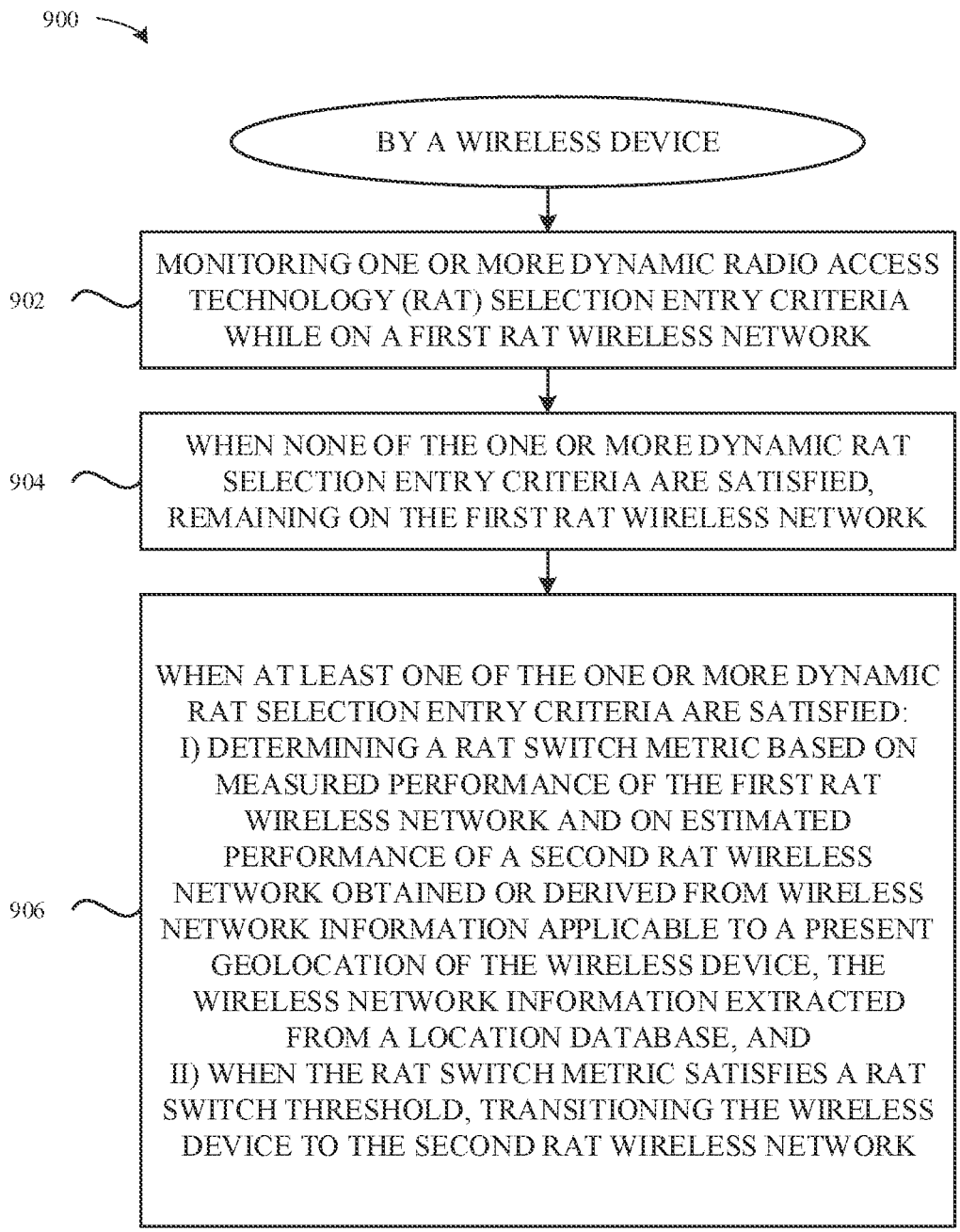
FIGS. 9A and 9B illustrate exemplary actions performed by a wireless device implementing a dynamic RAT selection procedure, according to some embodiments.

FIG. 9A illustrates a flowchart 900 of an exemplary method for dynamic RAT selection by a wireless device 102. At 902, the wireless device 102 monitors one or more dynamic RAT selection entry criteria while connected to a first RAT wireless network, e.g., via a first RAT connection. At 904, the wireless device determines to remain connected to the first RAT wireless network when none of the one or more dynamic RAT selection entry criteria are satisfied. At 906, when at least one of the one or more dynamic RAT selection entry criteria are satisfied, the wireless device 102: i) determines a RAT switch metric based on measured performance of the first RAT wireless network and on an estimated performance of a second RAT wireless network, e.g., via a potential second RAT connection, obtained from or derived from wireless network information applicable to a present geolocation of the wireless device 102, where the wireless network information is extracted from a location database, and ii) when the RAT switch metric satisfies a RAT switch threshold, the wireless device 102 transitions to the second RAT wireless network. The location database can include crowd-sourced wireless network performance data compiled from multiple wireless device 102. In some embodiments, the wireless device 102 switches from a first RAT connection to a second RAT connection to a cellular wireless network that supports both the first RAT and the second RAT.

Figure 9B:
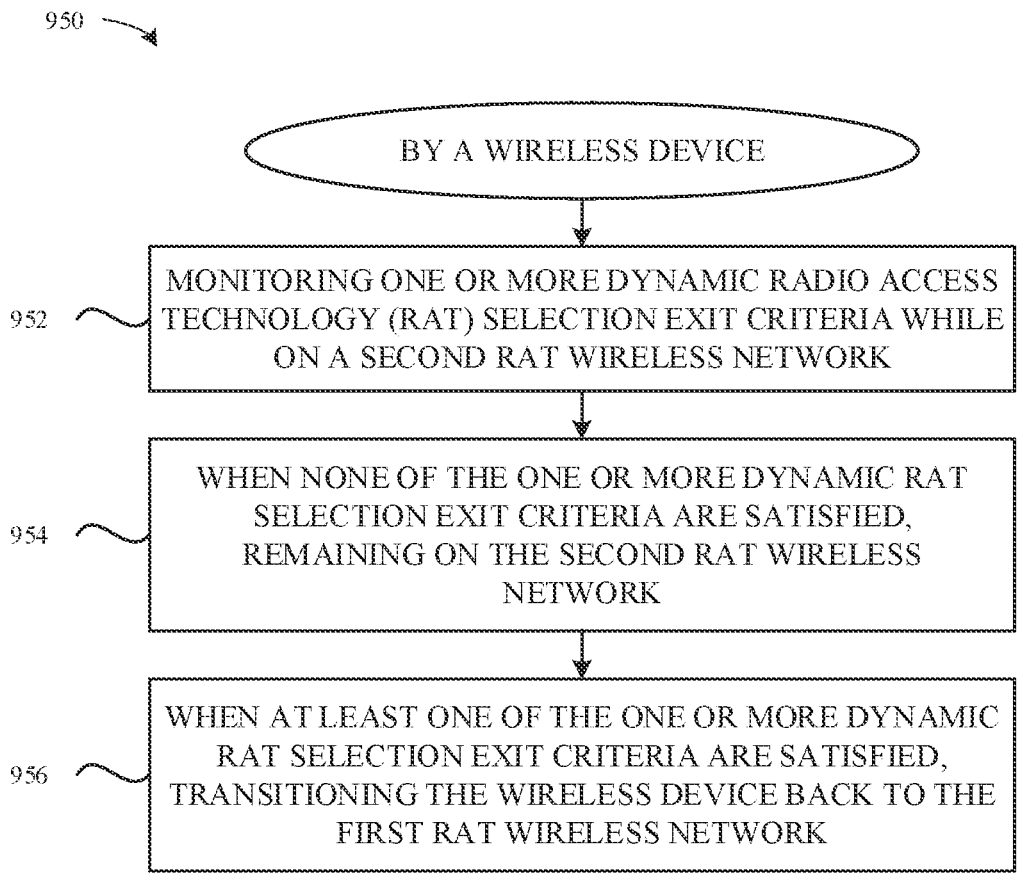

FIG. 9B illustrates a flowchart 950 of additional actions that the wireless device 102 can perform for dynamic RAT selection. At 952, the wireless device 102 monitors one or more dynamic RAT selection exit criteria while connected to the second RAT wireless network, e.g., via the second RAT connection. At 954, the wireless device 102 remains connected to the second RAT wireless network when none of the one or more dynamic RAT selection exit criteria are satisfied. At 956, the wireless device 102 transitions back to the first RAT wireless network when at least one of the one or more dynamic RAT selection exit criteria are satisfied.

In some embodiments, the one or more dynamic RAT selection entry criteria include an indication of initiation or usage of an application requiring throughput above a throughput threshold, and the one or more dynamic RAT selection exit criteria include an indication of ending usage of the application requiring throughput above the throughput threshold. In some embodiments, the one or more dynamic RAT selection entry criteria further include a fifth generation (5G) standalone (SA) dual connectivity feature being not configured at the wireless device. In some embodiments, the one or more dynamic RAT selection entry criteria further include no ongoing packet voice connections at the wireless device 102. In some embodiments, the one or more dynamic RAT selection entry criteria include an indication of network congestion on the first RAT wireless network and a lack of network congestion of the second RAT wireless network. In some embodiments, the first RAT wireless network is a 5G SA cellular wireless network, and the second wireless network is a 5G NSA cellular wireless network, which includes a 5G NR cellular wireless access portion and a 4G LTE cellular wireless access portion in parallel. In some embodiments, the first RAT wireless network is a 5G SA cellular wireless network, and the second RAT wireless network is a 4G LTE cellular wireless network. In some embodiments, the wireless device 102 transitions to the second RAT wireless network by at least: i) disabling a device capability to use the first RAT, ii) releasing, locally at the wireless device 102, existing connections to the first RAT wireless network, and iii) establishing a connection to the second RAT wireless network. In some embodiments, the RAT switch metric satisfies the RAT switch threshold when a radio frequency bandwidth available for use by the wireless device via the second RAT wireless network exceeds a corresponding radio frequency bandwidth available for use by the wireless via the first RAT wireless network by a predetermined bandwidth threshold. In some embodiments, the RAT switch metric satisfies the RAT switch threshold when a percentage difference between an estimated throughput for using a new connection via the second RAT wireless network and a measured throughput using a present connection via the first RAT wireless network exceeds a predetermined percentage difference threshold. In some embodiments, the estimated throughput for using the new connection via the second RAT wireless network is based on the wireless network information applicable to the present geolocation of the wireless device obtained from the location database. In some embodiments, the estimated throughput for using the new connection via the second RAT wireless network is based on measurements of one or more cells of the second RAT wireless network when a reliable throughput estimate for the second RAT wireless network is not available or derivable from the wireless network information applicable to the present geolocation of the wireless device obtained from the location database.

Representative Exemplary Apparatus

Figure 10:
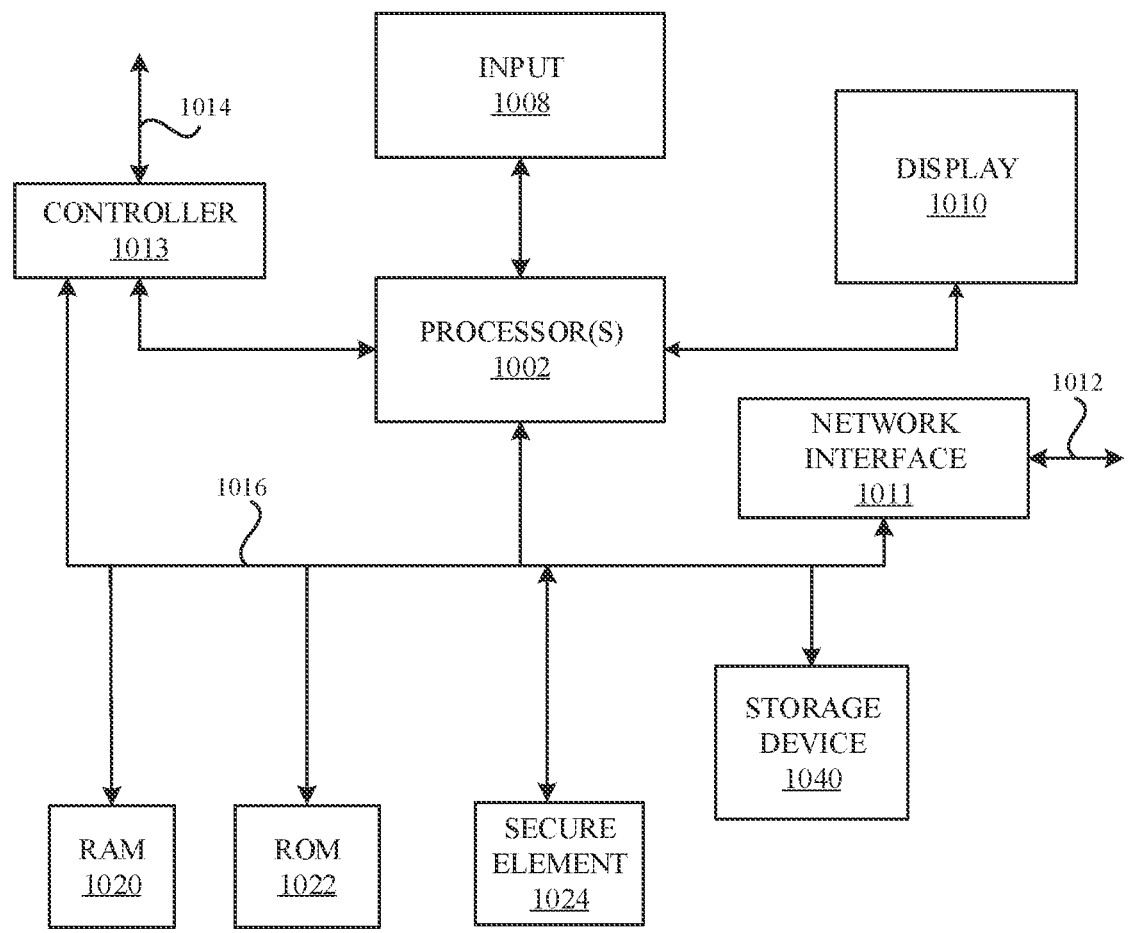
FIG. 10 illustrates a block diagram of exemplary elements of a mobile wireless device, according to some embodiments.

FIG. 10 illustrates in block diagram format an exemplary computing device 1000 that can be used to implement the various components and techniques described herein, according to some embodiments. In particular, the detailed view of the exemplary computing device 1000 illustrates various components that can be included in the wireless device 102. As shown in FIG. 10, the computing device 1000 can include one or more processors 1002 that represent microprocessors or controllers for controlling the overall operation of computing device 1000. In some embodiments, the computing device 1000 can also include a user input device 1008 that allows a user of the computing device 1000 to interact with the computing device 1000. For example, in some embodiments, the user input device 1008 can take a variety of forms, such as a button, keypad, dial, touch screen, audio input interface, visual/image capture input interface, input in the form of sensor data, etc. In some embodiments, the computing device 1000 can include a display 1010 (screen display) that can be controlled by the processor(s) 1002 to display information to the user (for example, information relating to incoming, outgoing, or active communication sessions). A data bus 1016 can facilitate data transfer between at least a storage device 1040, the processor(s) 1002, and a controller 1013. The controller 1013 can be used to interface with and control different equipment through an equipment control bus 1014. The computing device 1000 can also include a network/bus interface 1011 that couples to a data link 1012. In the case of a wireless connection, the network/bus interface 1011 can include wireless circuitry, such as a wireless transceiver and/or baseband processor. The computing device 1000 can also include a secure element 1024. The secure element 1024 can include an eUICC 108.

The computing device 1000 also includes a storage device 1040, which can include a single storage or a plurality of storages (e.g., hard drives), and includes a storage management module that manages one or more partitions within the storage device 1040. In some embodiments, storage device 1040 can include flash memory, semiconductor (solid state) memory or the like. The computing device 1000 can also include a Random-Access Memory (RAM) 1020 and a Read-Only Memory (ROM) 1022. The ROM 1022 can store programs, utilities or processes to be executed in a non-volatile manner. The RAM 1020 can provide volatile data storage, and stores instructions related to the operation of the computing device 1000.

Wireless Terminology

In accordance with various embodiments described herein, the terms "wireless communication device," "wireless device," "mobile device," "mobile station," "mobile wireless device," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for dynamic radio access technology (RAT) wireless network selection, the method comprising:
by a wireless device:
monitoring one or more dynamic RAT selection entry criteria while on a first RAT wireless network and not in a dynamic RAT selection mode;
when none of the one or more dynamic RAT selection entry criteria are satisfied, remaining on the first RAT wireless network and not in the dynamic RAT selection mode; and
when at least one of the one or more dynamic RAT selection entry criteria are satisfied:
entering the dynamic RAT selection mode;
determining a RAT switch metric based on measured performance of the first RAT wireless network and on estimated performance of a second RAT wireless network obtained or derived from wireless network information included in a location database, the wireless network information applicable to a present geolocation of the wireless device; and
when the RAT switch metric satisfies a RAT switch threshold, transitioning the wireless device to the second RAT wireless network and remaining in the dynamic RAT selection mode until one or more dynamic RAT selection exit criteria are satisfied,
wherein when the first RAT wireless network comprises a fifth generation (5G) standalone (SA) wireless network, the at least one of the one or more dynamic RAT selection entry criteria comprises no ongoing packet voice connections at the wireless device.

2. The method of claim 1, further comprising:
by the wireless device:
monitoring one or more dynamic RAT selection exit criteria while on the second RAT wireless network in the dynamic RAT selection mode;
when none of the one or more dynamic RAT selection exit criteria are satisfied, remaining on the second RAT wireless network in the dynamic RAT selection mode; and
when at least one of the one or more dynamic RAT selection exit criteria are satisfied, transitioning the wireless device back to the first RAT wireless network and exiting the dynamic RAT selection mode.

3. The method of claim 2, wherein:
the one or more dynamic RAT selection entry criteria include an indication of initiation or usage of an application requiring throughput above a throughput threshold; and
the one or more dynamic RAT selection exit criteria include an indication of ending usage of the application requiring throughput above the throughput threshold.

4. The method of claim 3, wherein the one or more dynamic RAT selection entry criteria further include a 5G SA dual connectivity being not configured at the wireless device.

5. The method of claim 3, wherein the one or more dynamic RAT selection entry criteria include an indication of network congestion on the first RAT wireless network and a lack of network congestion of the second RAT wireless network.

6. The method of claim 1, wherein:
the first RAT wireless network comprises the 5G SA cellular wireless network;
and the second RAT wireless network comprises a 5G non-standalone (NSA) cellular wireless network comprising 5G new radio (NR) cellular wireless access and fourth generation (4G) long term evolution (LTE) cellular wireless access in parallel.

7. The method of claim 1, wherein:
the first RAT wireless network comprises a 5G SA cellular wireless network;
and the second RAT wireless network comprises a fourth generation (4G) long term evolution (LTE) cellular wireless network.

8. The method of claim 1, wherein transitioning the wireless device to the second RAT wireless network comprises:
disabling a device capability to use the first RAT;

releasing, locally at the wireless device, existing connections to the first RAT wireless network; and
establishing a connection to the second RAT wireless network.

9. The method of claim 1, wherein the RAT switch metric satisfies the RAT switch threshold when a radio frequency bandwidth available for use by the wireless device via the second RAT wireless network exceeds a corresponding radio frequency bandwidth available for use by the wireless via the first RAT wireless network by a predetermined bandwidth threshold.

10. The method of claim 1, wherein the RAT switch metric satisfies the RAT switch threshold when a percentage difference between an estimated throughput for using a new connection via the second RAT wireless network and a measured throughput using a present connection via the first RAT wireless network exceeds a predetermined percentage difference threshold.

11. The method of claim 10, wherein the estimated throughput for using the new connection via the second RAT wireless network is based on the wireless network information applicable to the present geolocation of the wireless device obtained from the location database.

12. The method of claim 10, wherein the estimated throughput for using the new connection via the second RAT wireless network is based on measurements of one or more cells of the second RAT wireless network when a reliable throughput estimate for the second RAT wireless network is not available or derivable from the wireless network information applicable to the present geolocation of the wireless device obtained from the location database.

13. An apparatus configurable for operation in a wireless device, the apparatus comprising one or more processors coupled to a memory storing instructions that, when executed by the one or more processors, cause the wireless device to:
monitor one or more dynamic RAT selection entry criteria while on a first RAT wireless network and not in a dynamic RAT selection mode;
when none of the one or more dynamic RAT selection entry criteria are satisfied, remain on the first RAT wireless network and not in the dynamic RAT selection mode; and
when at least one of the one or more dynamic RAT selection entry criteria are satisfied:
enter the dynamic RAT selection mode;
determine a RAT switch metric based on measured performance of the first RAT wireless network and on estimated performance of a second RAT wireless network obtained or derived from wireless network information included in a location database, the wireless network information applicable to a present geolocation of the wireless device, the wireless network information applicable to a present geolocation of the wireless device; and
when the RAT switch metric satisfies a RAT switch threshold, transition the wireless device to the second RAT wireless network and remain in the dynamic RAT selection mode until one or more dynamic RAT selection exit criteria are satisfied,
wherein when the first RAT wireless network comprises a fifth generation (5G) standalone (SA) wireless network, the at least one of the one or more dynamic RAT selection entry criteria comprises no ongoing packet voice connections at the wireless device.

14. The apparatus of claim 13, wherein the wireless device is further configured to:
monitor one or more dynamic RAT selection exit criteria while on the second RAT wireless network in the dynamic RAT selection mode;
when none of the one or more dynamic RAT selection exit criteria are satisfied, remain on the second RAT wireless network in the dynamic RAT selection mode; and
when at least one of the one or more dynamic RAT selection exit criteria are satisfied, transition the wireless device back to the first RAT wireless network and exit the dynamic RAT selection mode.

15. The apparatus of claim 13, wherein:
the first RAT wireless network comprises the 5G SA cellular wireless network;
and the second RAT wireless network comprises a 5G non-standalone (NSA) cellular wireless network comprising 5G new radio (NR) cellular wireless access and fourth generation (4G) long term evolution (LTE) cellular wireless access in parallel.

16. The apparatus of claim 13, wherein the RAT switch metric satisfies the RAT switch threshold when a percentage difference between an estimated throughput for using a new connection via the second RAT wireless network and a measured throughput using a present connection via the first RAT wireless network exceeds a predetermined percentage difference threshold.

17. The apparatus of claim 16, wherein the estimated throughput for using the new connection via the second RAT wireless network is based on the wireless network information applicable to the present geolocation of the wireless device obtained from the location database.

18. The apparatus of claim 16, wherein the estimated throughput for using the new connection via the second RAT wireless network is based on measurements of one or more cells of the second RAT wireless network when a reliable throughput estimate for the second RAT wireless network is not available or derivable from the wireless network information applicable to the present geolocation of the wireless device obtained from the location database.

19. A wireless device comprising:
one or more antennas; and
one or more processors coupled to the one or more antennas and to a memory storing instructions that, when executed by the one or more processors, cause the wireless device to:
monitor one or more dynamic RAT selection entry criteria while on a first RAT wireless network and not in a dynamic RAT selection mode;
when none of the one or more dynamic RAT selection entry criteria are satisfied, remain on the first RAT wireless network and not in the dynamic RAT selection mode; and
when at least one of the one or more dynamic RAT selection entry criteria are satisfied; and
enter the dynamic RAT selection mode;
determine a RAT switch metric based on measured performance of the first RAT wireless network and on estimated performance of a second RAT wireless network obtained or derived from wireless network information included in a location database, the wireless network information applicable to a present geolocation of the wireless device; and
when the RAT switch metric satisfies a RAT switch threshold, transition the wireless device to the second RAT wireless network and remain in the dynamic RAT selection mode until one or more dynamic RAT selection exit criteria are satisfied, wherein when the first RAT wireless network comprises a fifth generation (5G) standalone (SA) wireless network, the at least one of the one or more dynamic RAT selection entry criteria comprises no ongoing packet voice connections at the wireless device.

* * * * *